US008579091B2

(12) United States Patent
Ruthinowski et al.

(10) Patent No.: US 8,579,091 B2
(45) Date of Patent: Nov. 12, 2013

(54) DYNAMIC DISPLACEMENT ENERGY MANAGEMENT DEVICE

(75) Inventors: Richard Edward Ruthinowski, Wayne, MI (US); Ian Brewster Hall, Wayne, MI (US); Parakrama Valentine Weerappuli, Oakland, MI (US); Brian Robert Spahn, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1051 days.

(21) Appl. No.: 12/265,308

(22) Filed: Nov. 5, 2008

(65) Prior Publication Data

US 2010/0109215 A1    May 6, 2010

Related U.S. Application Data

(63) Continuation of application No. 12/261,327, filed on Oct. 30, 2008, now Pat. No. 8,371,425.

(51) Int. Cl.
    *F16F 9/24*    (2006.01)
(52) U.S. Cl.
    USPC ........... 188/297; 280/804; 280/805; 280/806; 267/70
(58) Field of Classification Search
    USPC ............. 267/70; 280/804–806; 297/468, 472, 297/478, 216.11, 480; 188/297
    See application file for complete search history.

(56) References Cited

U.S. PATENT DOCUMENTS

| 2,724,463 | A |   | 11/1955 | Becker |
| 2,880,815 | A |   | 4/1959  | Apfelbaum |
| 3,572,621 | A |   | 3/1971  | Whitten et al. |
| 3,744,814 | A |   | 7/1973  | Sturman |
| 3,947,058 | A |   | 3/1976  | Laporte |
| 5,044,592 | A |   | 9/1991  | Cienfuegos |
| 5,328,118 | A |   | 7/1994  | Tokugawa et al. |
| 5,707,080 | A | * | 1/1998  | Isaji et al. ..................... 280/806 |

(Continued)

FOREIGN PATENT DOCUMENTS

| CN | 1891536 A | 1/2007 |
| FR | 2537002   | 6/1984 |

OTHER PUBLICATIONS

First Office Action dated Jul. 4, 2012 for Chinese Application No. 200910209918.6 (3 pages).

(Continued)

*Primary Examiner* — Robert A Siconolfi
*Assistant Examiner* — James Hsiao
(74) *Attorney, Agent, or Firm* — Franklin MacKenzie; Ford Global Technologies, LLC

(57) ABSTRACT

A dynamic energy management restraint anchor device interfaces with a child seat in a vehicle, engaging common child seat attachment clip features. A device restraint anchor is operable to dynamically extract and permit distortion of load bearing deformable member(s) in order to manage the displacement of, and load transferred through, an anchor connected to a child seat. The device may be further operable to limit or prevent restraint anchor displacement and the distortion of said deformable member(s) under quasi-static load conditions in order to meet motor vehicle static load/displacement anchorage performance requirements applicable to certain anchors. Anchor retraction capability and various interlocking configurations for securing the position of an anchor, before or after having extracted, may be incorporated relative to the energy management device interfacing with both a vehicle and a child seat. An indicator may further be provided to identify the functional state of the restraint device.

9 Claims, 14 Drawing Sheets

(56) References Cited

U.S. PATENT DOCUMENTS

| | | |
|---|---|---|
| 5,946,946 A | 9/1999 | Sharp et al. |
| 6,517,154 B2 | 2/2003 | Sawamoto et al. |
| 6,767,057 B2 | 7/2004 | Neelis |
| 6,880,483 B2 | 4/2005 | Fedders |
| 6,886,884 B2 | 5/2005 | Bull et al. |
| 7,278,684 B2 | 10/2007 | Boyle |
| 7,347,452 B2 * | 3/2008 | Maloney et al. ........... 280/801.1 |
| 7,370,822 B2 * | 5/2008 | Hiramatsu ................. 242/379.1 |
| 7,387,181 B2 | 6/2008 | Adoline et al. |
| 7,392,957 B2 * | 7/2008 | Hiramatsu ................. 242/379.1 |
| 7,401,834 B2 * | 7/2008 | Browne et al. ............... 296/68.1 |
| 7,407,193 B2 * | 8/2008 | Yamaguchi et al. .......... 280/805 |
| 7,455,322 B2 * | 11/2008 | Lin ............................... 280/805 |
| 7,520,555 B2 * | 4/2009 | Malapati et al. ............. 296/68.1 |
| 7,571,934 B2 * | 8/2009 | Bell et al. .................. 280/801.1 |
| 7,862,087 B2 * | 1/2011 | Martinovic ................... 280/805 |
| 8,141,950 B2 * | 3/2012 | Boyer ........................ 297/250.1 |
| 2004/0051356 A1 | 3/2004 | Neelis |
| 2004/0104566 A1 | 6/2004 | Adoline et al. |
| 2004/0113341 A1 | 6/2004 | McConnell et al. |
| 2004/0222579 A1 | 11/2004 | Adoline et al. |
| 2007/0001495 A1 | 1/2007 | Boyle et al. |
| 2007/0120001 A1 | 5/2007 | Esler et al. |
| 2007/0241550 A1 * | 10/2007 | Bieg et al. ..................... 280/806 |
| 2007/0251776 A1 | 11/2007 | Braun |
| 2010/0051733 A1 * | 3/2010 | Yamada ........................ 242/374 |

OTHER PUBLICATIONS

Search Report dated Jun. 26, 2012 for Chinese Application No. 200910209918.6 (2 pages).

English Language Abstract for FR 2537002, Jun. 8, 1984.

* cited by examiner

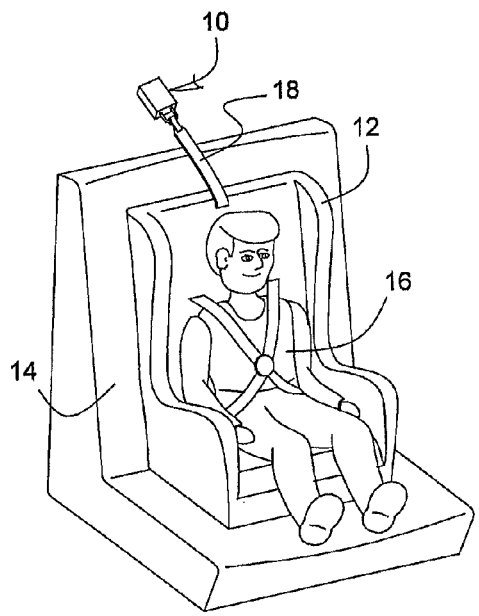
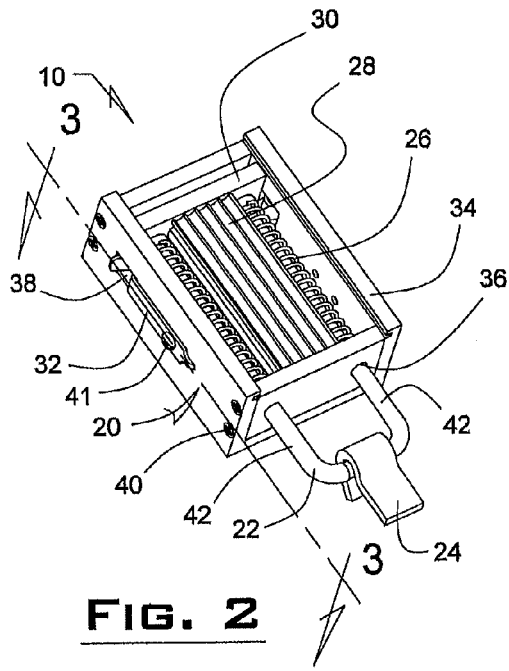
FIG. 1      FIG. 2
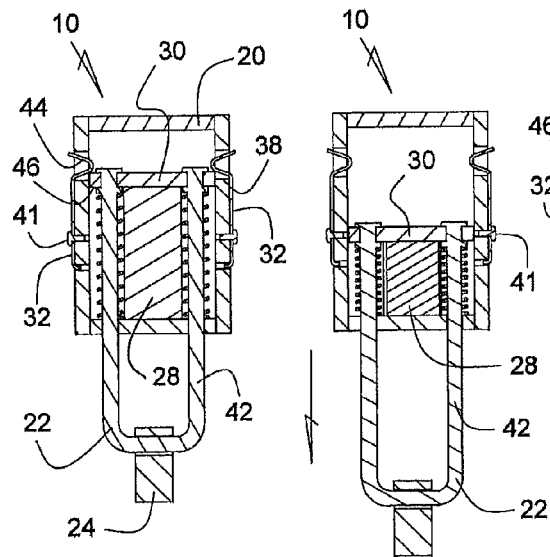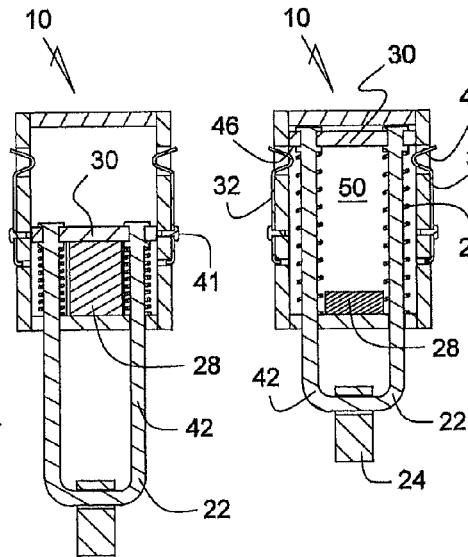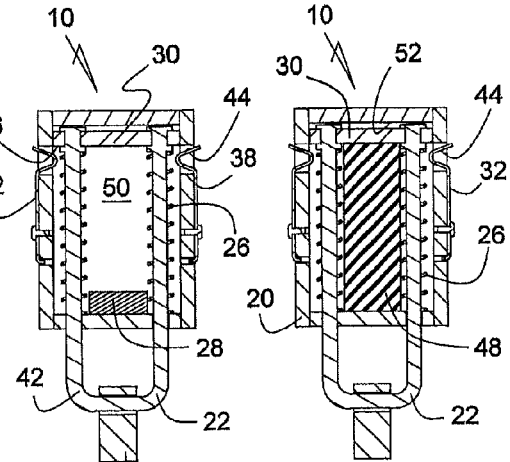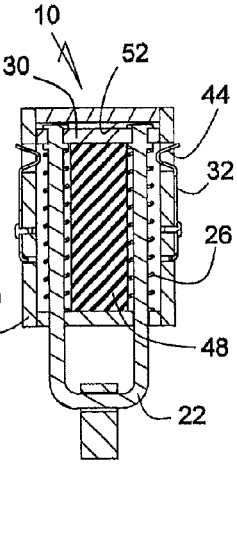
FIG. 3     FIG. 4     FIG. 5     FIG. 6

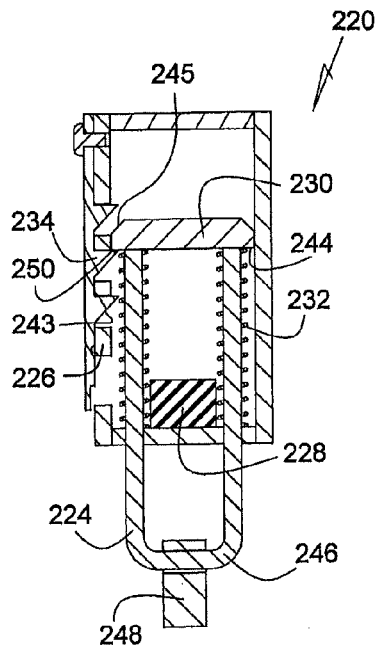
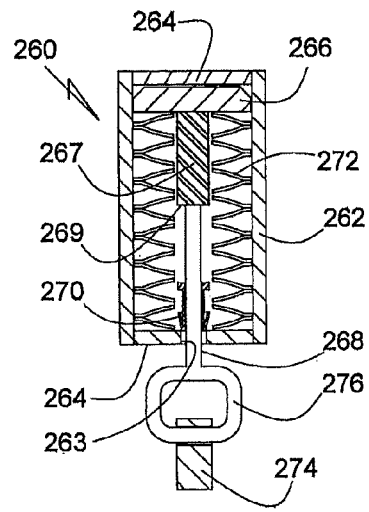
FIG. 17
FIG. 18
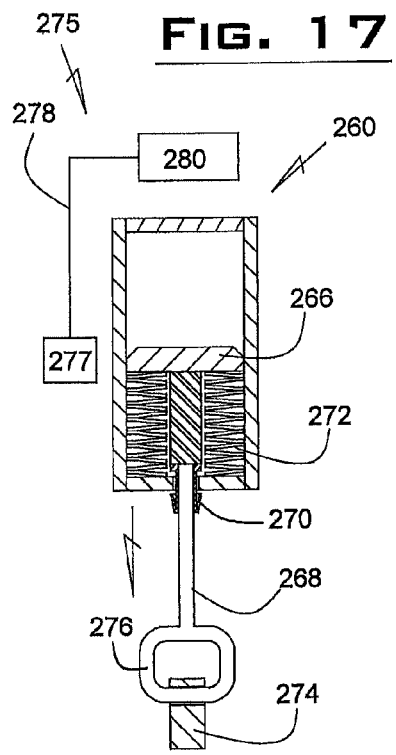
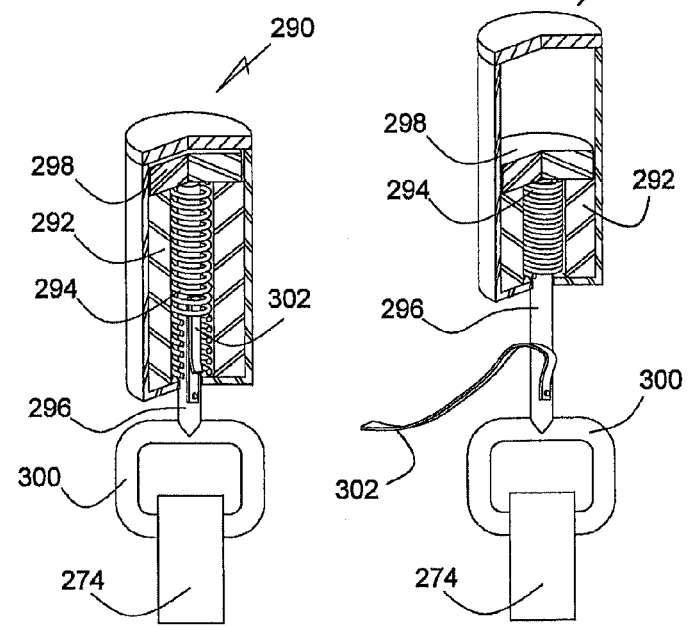
FIG. 19
FIG. 20
FIG. 21

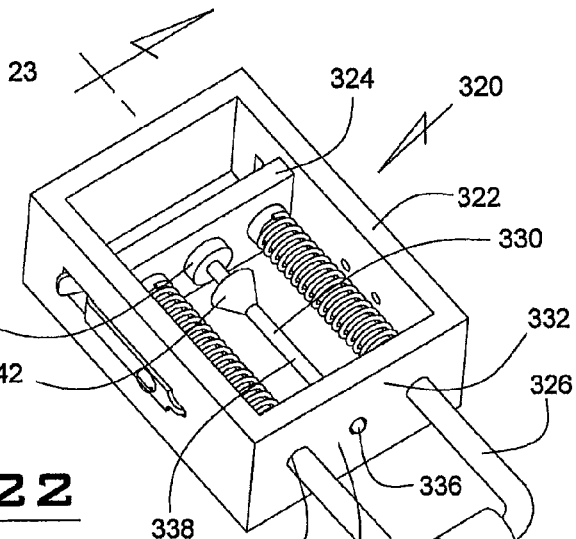
FIG. 22
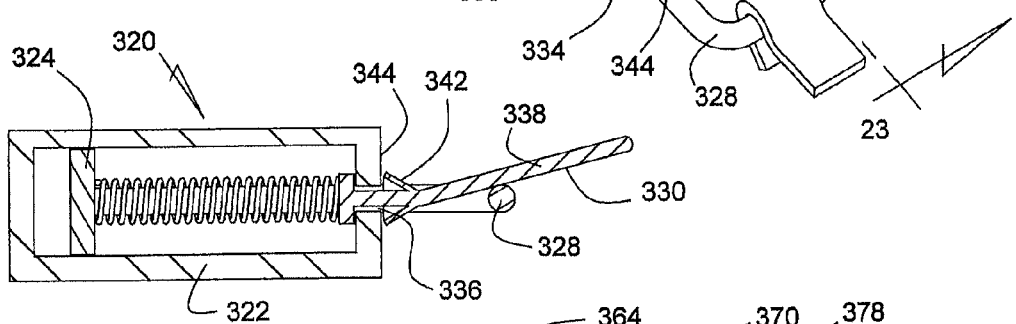
FIG. 23
FIG. 24
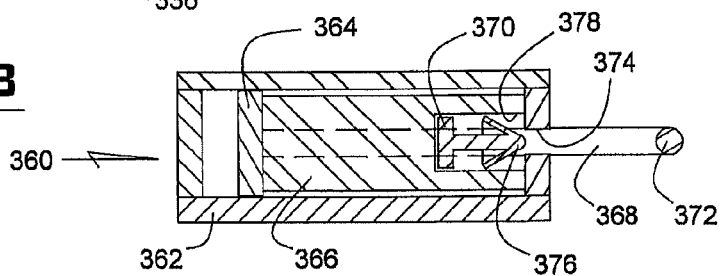
FIG. 25
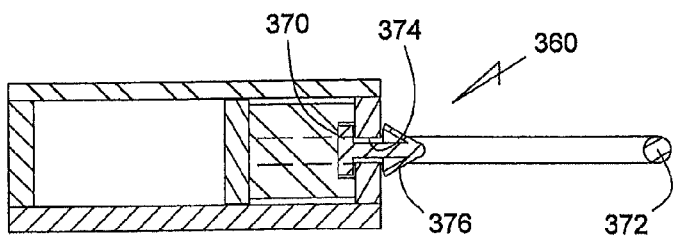

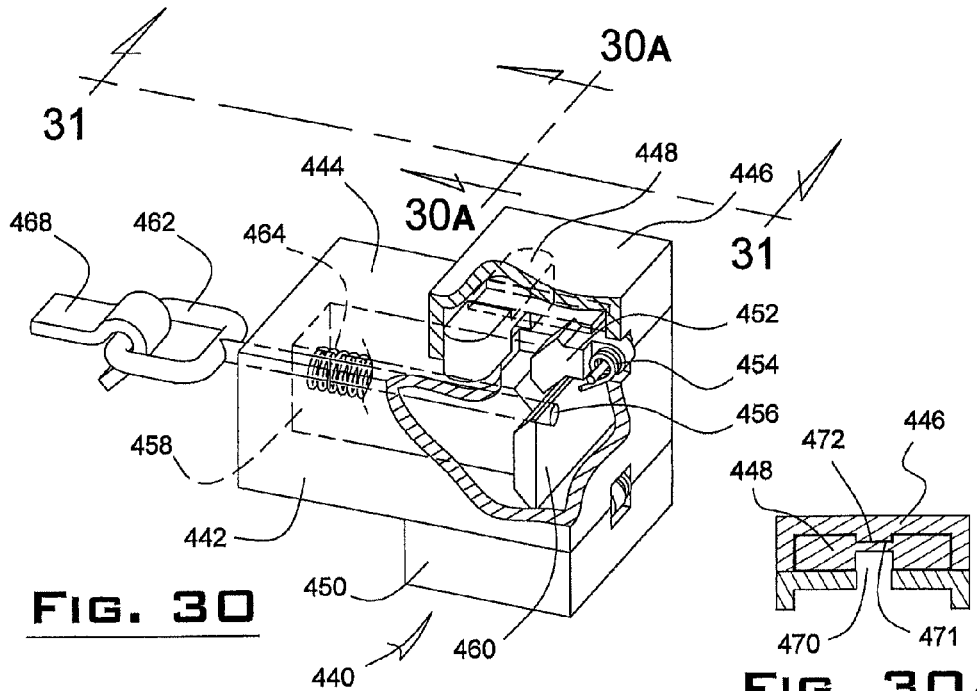
FIG. 30
FIG. 30A
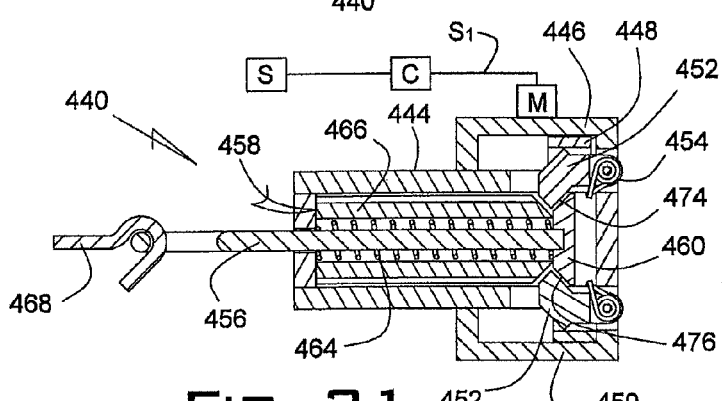
FIG. 31
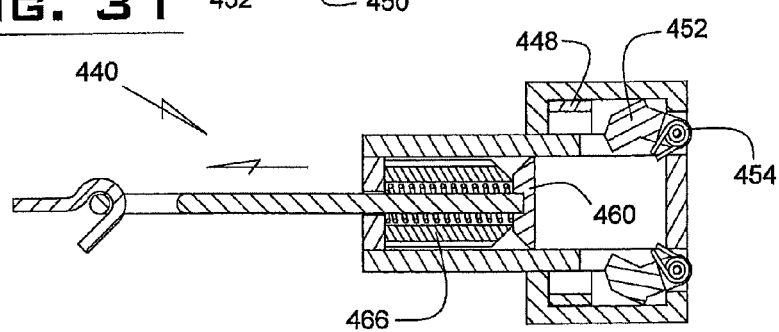
FIG. 32

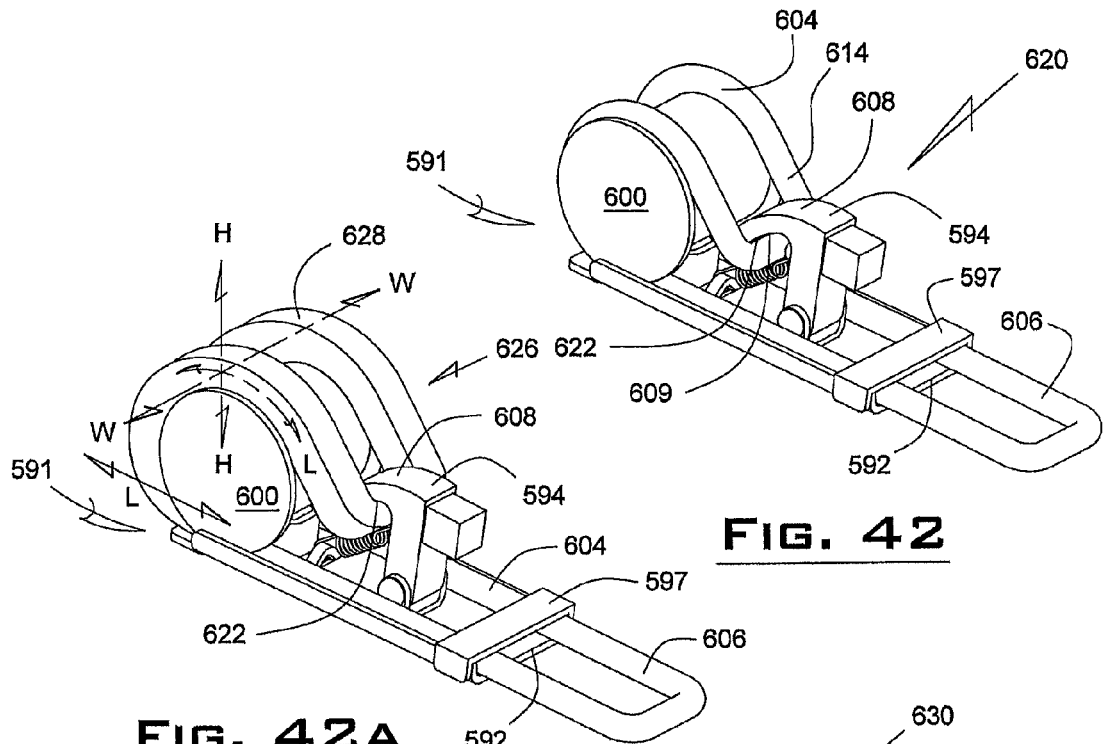
FIG. 42
FIG. 42A
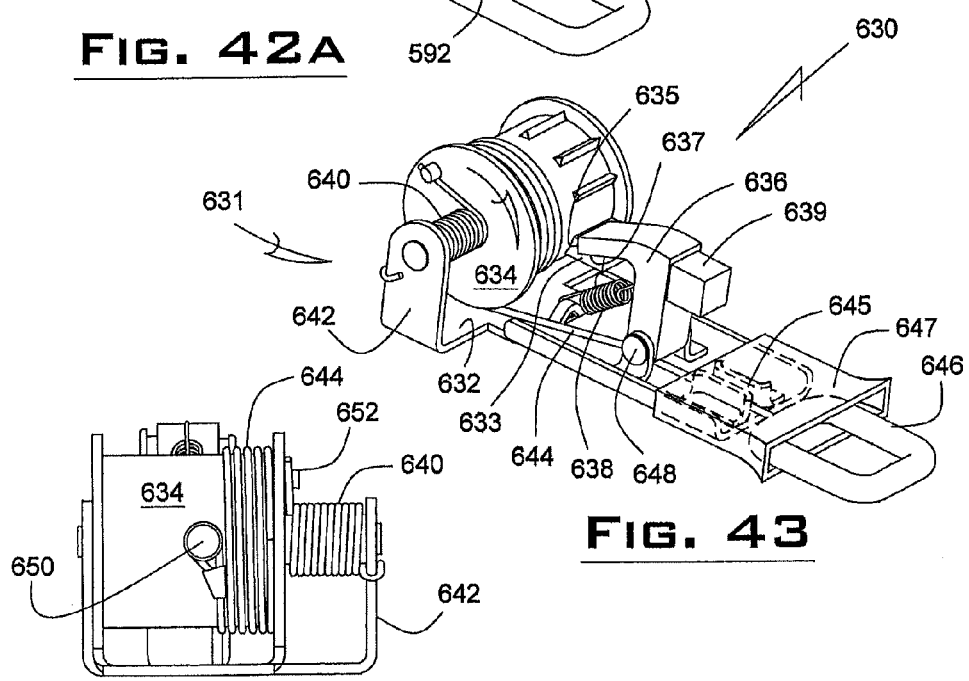
FIG. 43
FIG. 44

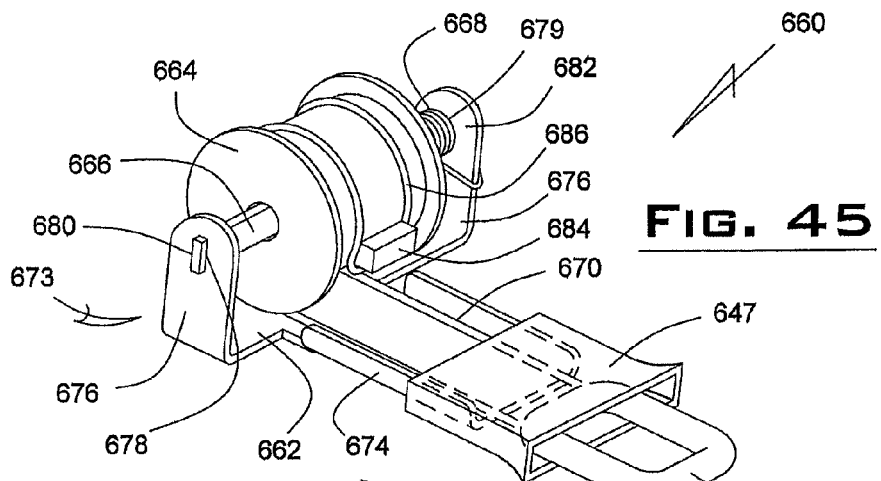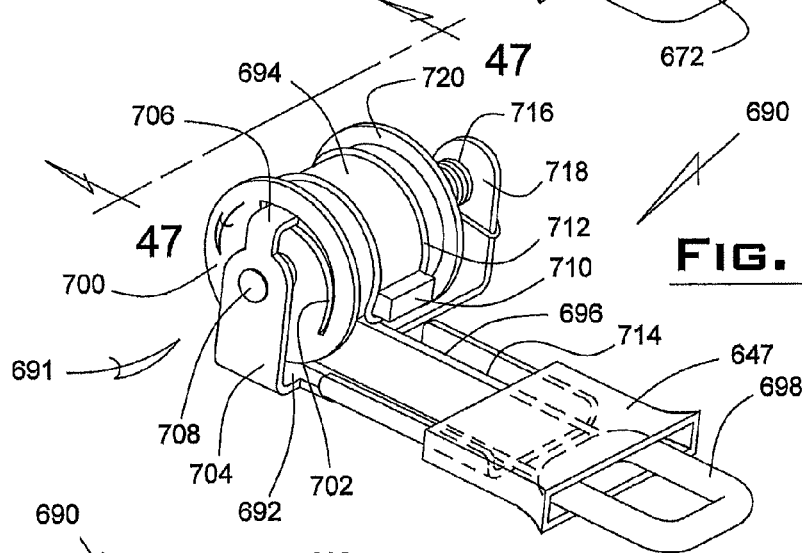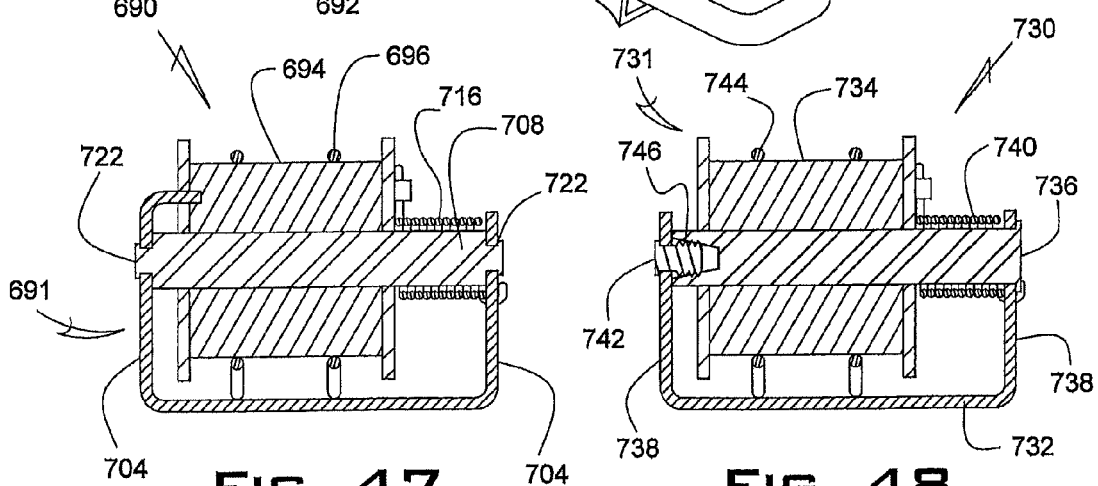

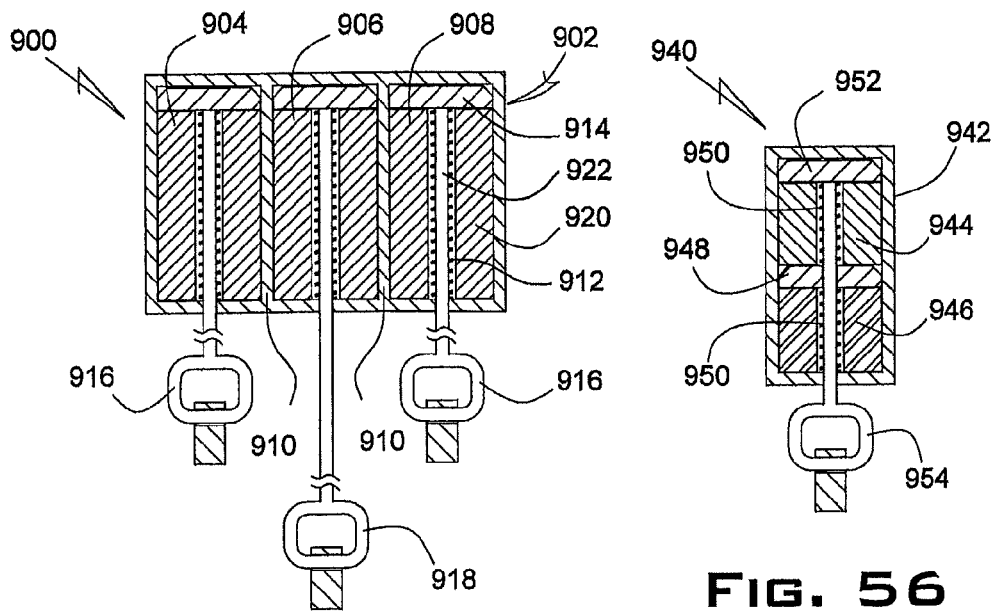
FIG. 55
FIG. 56
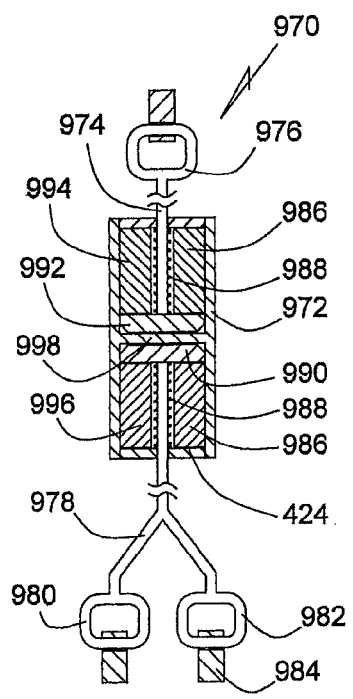
FIG. 57
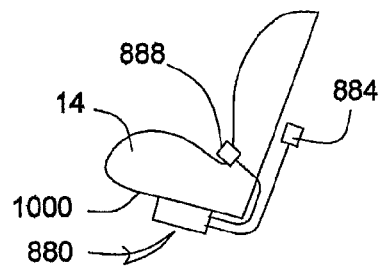
FIG. 58
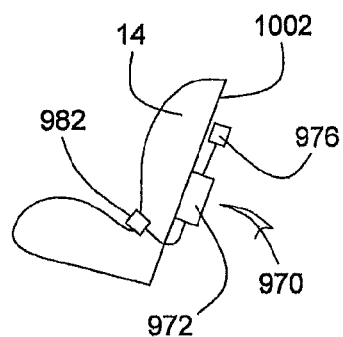
FIG. 59

DYNAMIC DISPLACEMENT ENERGY MANAGEMENT DEVICE

CROSS REFERENCE TO RELATED APPLICATIONS

This application is a Continuation application of U.S. Ser. No. 12/261,327, with a filing date of Oct. 30, 2008, which is hereby incorporated by reference in its entirety.

BACKGROUND AND SUMMARY OF THE INVENTION

The present invention relates to a child seat energy management restraint anchor device for use in connection with a child seat that is secured to a vehicle seat and, more particularly, to an improved restraint device or system that manages the load and displacement characteristics of one or more child seat anchors upon experiencing a vehicle impact condition or a predetermined change in acceleration.

Child safety seats are routinely secured to the seat of a vehicle through conventional methods and use of such equipment as a standard vehicle seat belt and child seat attachment hardware such as tethers or straps that are generally included with, or integral to, the child seat assembly. The tethers or straps have hooks, clips, clasps and/or rigid, quick release engagement clip or claw-like mechanisms at their ends to engage the vehicle seat anchors. Standard systems routinely utilize child seat straps with quick release mechanisms for directly engaging the vehicle anchors, or a conventional child seat tether/strap or belt assembly wherein the seat belt and/or child tether/strap webbing is intertwined through brackets or guide apertures in the child seat, so that the child seat may be drawn against the vehicle seat and secured to the vehicle seats lower restraint anchors. Additionally, a top tether incorporating a tether hook, clip or clasp also engages a vehicle anchor to further secure the upper portion of the child seat to the vehicle seat. Child safety seats generally move in a car-forward direction, relative to the vehicle seat, during an abrupt vehicle deceleration or dynamic frontal vehicle impact event, causing a resulting inertial force to be impinged on the points of contact between the child seat attachment hardware and the interfacing vehicle restraint anchors. The effects of such inertial forces can be significant and thus management of these forces can be helpful to reduce the loads transferred to the seated child occupant.

It is therefore desirable to reduce occupant injury in child seats by providing an energy management restraint anchor device that enhances the functional relationship between the child seat and the controlled, common points of engagement with the vehicle interior environment, in order to manage the displacement of a child seat, and the corresponding energy transferred to the child occupant, as the result of an abrupt vehicle deceleration or vehicle impact event. This may be achieved by controlling the translation and rotation of a child seat that is engaged with a vehicle's restraint anchors, subjected to the aforementioned conditions. One or more load bearing deformable energy absorbing elements are incorporated in each energy management restraint anchor device, or each shared energy management restraint anchor system. The deformable elements are configured to be distorted and/or displaced when subjected to predetermined restraint anchor input load conditions, thereby absorbing and redistributing restraint energy and permitting corresponding restraint anchor extraction. Incorporation of one or more load bearing deformable members that may, when combined together or incorporated individually, exhibit a variety of material properties, cross-sectional geometries, and correspondingly unique resultant energy absorption characteristics, enhances the ability to tune the load redistribution and anchor displacement capabilities of the energy management restraint device. A wide variety of energy management characterization profiles may therefore be derived for a given restraint anchor, or combination of anchorages associated with an energy management restraint device or system, including progressive, digressive, multi-level and variable rise rate load limiting that may be achieved over a variety of predetermined anchor displacement values, thereby enabling customized load carrying and load redistribution characteristics for various occupant sizes or occupant loading conditions.

Additionally, in markets such as the United States, FMVSS 225 regulations provide specific quasi-static load carrying capacity and displacement requirements, applicable to lower anchors. Accordingly, there is a need to provide a lower restraint anchor device or system uniquely capable of permitting dynamic anchor displacement and corresponding energy management without permitting excessive anchor deformation or displacement under quasi-static loading conditions, in order to meet lower anchorage static load requirements of FMVSS 225. This may be achieved by incorporating dynamic energy management and anchor displacement control interlock features, in association with an energy management restraint anchor device or system, operable to prevent or restrict dynamic anchor movement under quasi-static conditions, thereby providing restraint anchor performance characteristics comparable to that of traditional fixed position anchors known in the art. Such displacement control features are further operable to release an anchor from a constrained position in order to facilitate dynamic restraint energy management functionality. The interlocking controls may be activated by way of inertial forces impinging upon them, or by an electrical signal controlling the interlocking component engagement relationship, in order to facilitate the appropriate energy management and anchor displacement functionality.

It is also desirable to provide an energy management anchorage device or system that facilitates retraction of a deployed restraint anchor after having at least partially deformed the energy absorption material(s), to aid in re-coupling the rebounding child seat with the vehicle seat as the rate of vehicle deceleration decreases. Retraction may occur unassisted as the child seat rebounds to re-engage the vehicle seat, or retraction may be facilitated mechanically by incorporating one or more anchor biasing return assist members, operable to aid in returning the displaced anchor towards a pre-deployed position. Anchor assist members may be spring biased. Retraction may be achieved as a result of an electronic signal provided to activate a variety of mechanical, electro-magnetic, actuator driven or motorized retraction features or mechanisms associated with an energy management device restraint anchor.

It is further desirable to provide various interlocks for controlling the displacement of an energy management restraint device anchor at various phases of device operation. A variety of interlocking engagement conditions are described relative to controlling the movement of said anchor. An interlock may be employed to retain an anchor in a first un-deployed position, or to limit the rate, or total amount, of anchor displacement permitted in combination with the distortion of at least one deformable material member. An interlock may be operable to preclude anchor displacement in an unloaded condition or under quasi-static load conditions, and may release or restrain an anchor when the energy management device experiences a predetermined change in inertial acceleration. An interlock may also be employed to either temporarily or permanently fix the position of an extracted or retracted anchor, or to prevent or permit secondary extraction of an anchor under predetermined conditions. An interlock may be provided to fix the position of an anchor in an intermediate position, relative to a fully extracted or retracted position. An inertial interlock may be engaged or disengaged as the result of a change in position of a mechanically articulating member having a biased mass portion, or that may be spring biased. An interlock may also be represented by magnetic, motorized, solenoid or similar actuator driven components operable to the control movement of a restraint anchor, wherein said actuator receives a control signal derived from identification of a predetermined device state change, detected by an electronic or mechanical sensor.

It is desirable to provide an improved energy management anchorage device or system that interfaces with the child seat attachment hardware and may be mounted to a structural or load bearing member of the vehicle seat, package tray, roof, floor, or any other desired location as permitted by law.

The present invention includes a dynamic displacement energy management anchorage device or system for use with at least one vehicle child seat. The device or system may include one or more of the following—a retainer or housing; an anchor; a fixed-position or moveable load bearing member relative to which at least one load bearing deformable energy absorption member may be positioned or react against; a connecting member generally interfacing with a load bearing member and an anchor or anchor end; an element for biasing the position of an anchor, facilitating anchor retraction during rebound or supplement the recovery of a resilient deformable material; at least one interlock configurable to control the position of said anchor under one or more operating conditions; an indicator for signaling one or more states of device function.

Further areas of applicability and functional characteristics of the present invention will become apparent from the detailed description provided herein. It should be understood that the detailed description and specific examples, while indicating preferred embodiments of the present invention, are intended for purposes of illustration only, and various changes and modifications within the spirit and scope of the invention will become apparent to those skilled in the art from this detailed description. It will be appreciated that the present invention can be utilized in automotive, aerospace, nautical, amusement or alternative land-based personal or commercial vehicle or cargo transportation applications where it is desirable to manage the displacement of a child seat anchorage, an occupant secured to an anchorage, or where other transportable items may need to be tethered to anchorages.

BRIEF DESCRIPTION OF THE DRAWINGS

FIG. 1 is a perspective view of a child seat mounted to a vehicle seat, utilizing one embodiment of the novel energy management anchorage device depicted as being operatively associated with an upper tether;

FIG. 2 is a perspective view of one embodiment of an energy management anchorage device exposing the components contained within the housing;

FIG. 3 is a section view taken from the perspective of line 3-3 of FIG. 2, illustrating the energy management device prior to activation;

FIG. 4 illustrates a cross section view of the energy management device of FIG. 2, taken from the perspective of line 3-3, with the anchor extracted and the load bearing deformable member under compression loading;

FIG. 5 illustrates a cross section view of the energy management device of FIG. 2, taken from the perspective of line 3-3, with the anchor shown in a retracted and interlocked resting position;

FIG. 6 illustrates a cross section view of the energy management device in a retracted position, wherein the load bearing deformable member has recovered;

FIG. 17 illustrates a sectional view of the FIG. 15 device with the anchor at least partially retracted and locked in one of several possible interlocking positions;

FIG. 18 illustrates a sectional view of an alternative energy management device shown in an un-deployed position, wherein the deformable member is comprised of flexible washers or similar members;

FIG. 19 illustrates the FIG. 18 embodiment in a deployed position, the anchor extracted, deformable member under compression loading and an indicator visible from retainer surface;

FIG. 20 illustrates a sectional view of an alternative energy management device utilizing a single centrally disposed anchor connecting member, an alternative housing geometry and an anchor extraction indicator;

FIG. 21 illustrates the FIG. 20 energy management device with the extraction indicator in a deployed position;

FIG. 22 illustrates an alternative energy management device incorporating another type of anchorage extraction indicator;

FIG. 23 illustrates a sectional view of the FIG. 22 embodiment taken from the perspective of line 23-23, showing the indicator in the deployed position;

FIG. 24 illustrates a sectional view of an alternative energy management device utilizing an alternative anchorage extraction indicator;

FIG. 25 illustrates a sectional view of the FIG. 24 device showing the indicator in the deployed position;

FIG. 30 illustrates an alternative energy management device having a dynamic anchor displacement and energy management control interlock the employs moveable blocking masses operable to disengage swing levers that control a moveable member, distortion of deformable material and movement of an anchor;

FIG. 30A is a sectional view taken from the perspective of arrow 30A-30A of FIG. 30, illustrating the geometric relationship between a blocking member, an interfacing guide channel on a surface of the retainer or housing wall, and a retention member engaging said blocking member;

FIG. 31 is a sectional view taken from the perspective of arrow 31-31 of FIG. 30, illustrating the device prior to deployment, depicting the moveable member engaged with the swing levers;

FIG. 32 is a sectional view of the FIG. 30 device, wherein the moveable blocking masses have been displaced and swing levers disengaged from contact with the moveable member, enabling anchorage extraction and subsequent energy management through displacement of the deformable member;

FIG. 42 illustrates an alternative energy management device incorporating a dynamic anchor displacement and energy management control interlock wherein a retention member directly engages a loop-shaped deformation member;

FIG. 42a illustrates an alternative energy management device wherein the loop-shaped deformable member has varying geometry to further enhance variable or multi-level load limiting capability;

FIG. 43 illustrates an alternative energy management device incorporating a dynamic anchor displacement and energy management control interlock and a connecting member that wraps around a spool-shaped retainer member, wherein the deformable material member is spring-like;

FIG. 44 is a rear view of the FIG. 43 device;

FIG. 45 illustrates an alternative energy management device with a deformable member extending through the load bearing retainer member to manage energy transfer and anchorage extraction;

FIG. 46 illustrates an alternative energy management device employing a tapered slot within a deformable side wall member of the load bearing retainer member, wherein a tab engages the slot to resist rotation of the adjoined deformable and load bearing retainer members during anchor extraction;

FIG. 47 illustrates a sectional view taken from the perspective of line 47-47 in FIG. 46, showing the tab and slot relationship;

FIG. 48 illustrates a section view of an alternative energy management device where a stud penetrates a hole in an axle to resist rotation of the load bearing retainer member during anchor extraction;

FIG. 55 illustrates an energy management anchorage system in which one or more deformable members are disposed relative to a single retainer to manage the combined energy transferred along a common load path through the upper and lower anchorages, for at least one seating position;

FIG. 56 illustrates an alternative energy management device with a plurality of different deformable members contained within a single housing, or relative to a single retainer to control a single anchor;

FIG. 57 illustrates an alternative energy management device wherein multiple deformable members are disposed within a single housing to manage the energy transferred to the upper and lower anchorages, where the upper and lower anchorage load paths are oriented in opposing directions;

FIG. 58 illustrates systems such as those depicted in FIGS. 54 and 55 mounted in a satellite location beneath the vehicle seat; and FIG. 59 illustrates positioning systems such as the one illustrated in FIG. 57 in a satellite location on the back of a vehicle seat.

DETAILED DESCRIPTION OF THE INVENTION

Figure 7:
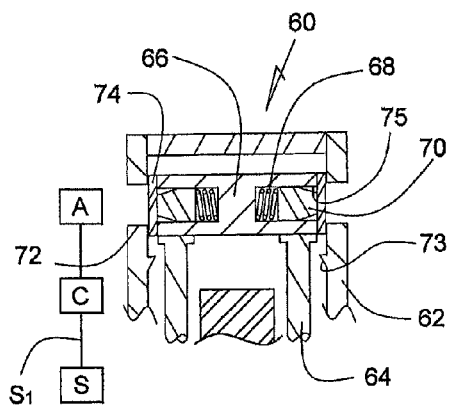
FIG. 7 illustrates a cross section view of an alternative interlocking engagement for an energy management device incorporating spring-biased tapered pins for securing the position of the moveable member and corresponding restraint anchor(s)

The present invention will become more fully understood from the detailed description and the accompanying drawings, wherein:

FIG. 1 illustrates an energy management anchor device 10, a child seat 12, a vehicle seat 14 and an occupant 16. In this embodiment a top tether 18 is shown secured to the device 10 and to the child seat 12. Device 10 may be affixed to a structural or load bearing member of the vehicle such as a package tray or roof, to the vehicle seat, to the floor or a trunk wall of the vehicle or to an alternative member in an alternative location permitted by law, to enable child seat attachment with the anchors. In this embodiment, the device 10 is depicted in a location representing attachment to a package tray or vehicle roof.

With reference to FIG. 2, device 10 includes a housing or retainer 20, relative to which at least one load bearing deformable member or energy absorption material 28, a generally non-deformable moveable load bearing member 30, and an anchor 22 may be displaced. Device 10 may include one or more interlocking members 32 (depicted as a spring clips or elongated locking tabs extending from retainer 20 in this embodiment). A child seat tether hook, clasp, clip or quick connect claw-like mechanism 24 attaches to anchor 22. The device may additionally include one or more anchor biasing return assist members 26 (depicted as springs for this embodiment). The retainer 20 may have a top, bottom, end walls and side walls 34 with one or more openings 36 for one or more connecting members 42 to extend and extract through as anchor 22 is dynamically displaced. One or more of the side walls 34 of retainer 20 may have one or more interlocking engagement surfaces 38 (depicted as window openings in the housing or retainer in this embodiment) for receiving the interlocking members 32 that impinge upon the moveable load bearing member 30 under certain conditions. An interlocking engagement surface 38 may be represented by one or more surfaces of a clearance aperture in the retainer wall as shown, or by at least one alternative contact surface oriented in a manner to adequately retain an interlocking member in a fixed position and to facilitate in restraining displacement of the moveable load bearing member. Interlocking engagement surfaces 38 and interlocking member 32 may be adapted to be represented by alternative component geometries, positioned in a plurality of non-limiting locations along the length or width of device 10, or in relation to the end wall of retainer 20, opposite the end incorporating opening 36. A single interlocking member 32 may be configured to achieve the desired functional result, or multiple interlocking members 32 may be incorporated, as is depicted by a pair of members encompassing symmetrically disposed connecting members 42 in FIG. 2.

In the FIG. 2 embodiment, both the individual component walls of housing or retainer 20 and the interlocking members 32 are depicted as being affixed to one another through the use of fasteners 40 and 41, respectively, but it will be appreciated that other means of joining the walls of retainer 20 and interlocking member(s) 32 such as tabs or clips to housing 20, are contemplated. The retainer 20 may be more efficiently and integrally formed to include a greater number of wall surfaces in a single component, thereby requiring fewer independent and distinctly separate top, bottom, side or end wall component enclosure surfaces be assembled to one another and reducing or eliminating the need for use of fasteners 40. Additionally, integral interlocking member(s) 32 may be configured to extend directly from the retainer 20, through a variety of current and emerging manufacturing processes, eliminating the need for separate assembly by way of fastener 41. In general, the geometries of the components of device 10 may vary from that depicted while still achieving the same functional performance in alternative package environments.

Return assist members may be configured to surround the connecting member for package efficiency (as generally shown in the figures contained herein), or may be disposed elsewhere within or external to the device retainer, such as adjacent to, or in series with, connecting member(s) or movable member(s) as is shown in later Figures.

The components of the energy management device shown in FIG. 2 (and other embodiments later described or depicted herein) may be self-contained within a housing or retainer 20 that may be generally represented as an enclosure. Alternatively, the components of a device may instead be maintained in assembly relative to a retainer, or partial housing, having few wall surfaces that do not entirely encapsulate the components of said device. FIG. 2 depicts a device with 2 end walls and 3 side walls, for example. A fourth side wall may be removed from the FIG. 2 device in order to more clearly expose the internal components for illustration purposes, or to provide an example of a device having components that are not entirely encapsulated the device retainer. An end wall may be removed from the devices depicted in FIGS. 7-10 without adversely affecting device function. The devices of FIGS. 39-48 are further shown having a base-like mounting wall member and a moveable or fixed-position, cylindrically shaped load bearing member representing the primary components of said retainer, for example. A pair of mounting arms extend from the base-like wall of said retainer in various latter figures. An energy management restraint anchor device may be mounted to a structural member within the vehicle, relative to an independent enclosure or cover that is operable to further encapsulate said device. Said enclosure or cover may be installed during the vehicle assembly process, and may attach directly to a component of the vehicle located in proximity to the energy management device itself. For example, an independent aesthetic cover (not shown) may be affixed to the vehicle seatback or package tray, or members such as vehicle seat backs or package trays themselves may incorporate cover-like geometries, operable to contain and protect any at least partially exposed working components of said device, relative to retainer 20. Enclosing the components of the restraint device may prevent direct access by occupants or items that may be found in a vehicle environment that may come into contact with the device and affect device functionality.

In the FIG. 2 embodiment, the load bearing deformable member 28 is disposed between the two axially extending connecting members 42, which may either be represented by independent components affixed to anchor 22, or may be integrally formed as an extension of anchor 22. Connecting members 42 in this embodiment are shown integral to anchor 22. In reference to fixed-position, or moveable load bearing members generally described in reference to the embodiment of the FIG. 2 device, and various latter embodiments described or depicted herein, said load bearing member may also be affixed or fastened to one or more connecting members, or may be integrally formed as a single continuous component comprising a moveable member portion, a connecting member portion and an anchor (or anchor end) portion. As such, connecting members, load bearing members and anchors or anchor ends may simply be described as interfacing one another without specificity as to the means of interfacing engagement. The deformable member(s) 28 may be comprised of any materials and geometries capable of providing appropriate deformation characteristics, enabling controlled energy management and corresponding anchor displacement for a given application. For example, the deformable member 28 may be represented by a thin walled, hexagonal cell structure aluminum extrusion.

It will be appreciated that one or more load bearing deformable members described in reference to the embodiment of the FIG. 2 device, and various latter embodiments described or depicted herein, could be resilient, having "memory", wherein the deformable member exhibits the capability of partially or completely rebounding and recovering at least some portion of its initial geometry and load carrying capability after having been distorted. Such capability may facilitate re-use of the load bearing deformable material, which may enable device 10 to function in multiple instances of abrupt vehicle deceleration, in the event of a secondary impact, a rollover, or similar type of vehicle impact condition. High density energy absorption foams, various fiber meshes and other materials such as these further provide rate sensitive load carrying characteristics, wherein rapid loading results in effectively stiffening the material. With materials of this nature, the rate of recovery may differ from the rate of loading. Thus, it will be appreciated that various forms of deformable material 28 can be employed, depending upon the desired performance result. It should also be noted in reference to the embodiment of the FIG. 2 device, and various latter devices described or depicted herein, that one or more deformable members may instead be configured to manage energy by way of expansion rather than compression, by twisting, rotating or uncoiling relative to an axis, or by distorting one or more contact surfaces relative to another member of the device as a result of an interference condition between at least one moveable member and another fixed or moveable member, wherein the deformable member itself may be either fixed or moveable. Deformable member(s) 28 may be configured to be disposed within or external to retainer 20, and may be located other than between connecting members 42. As an alternative means of energy management or interlocking anchor control, one or more side walls of retainer 20 may include extended apertures or slots having constant or variable geometry, operable to be deformed by a tab-like protrusion extending from the load bearing moveable member for the purposes of energy management and controlling said anchors displacement. In general, deformable members described in reference to this and the various forthcoming device embodiments described herein, are operable to bias the position of an anchor to maintain an initial position prior to being distorted and permitting the anchor to be located in a variety of alternative retracted positions.

Figure 50:
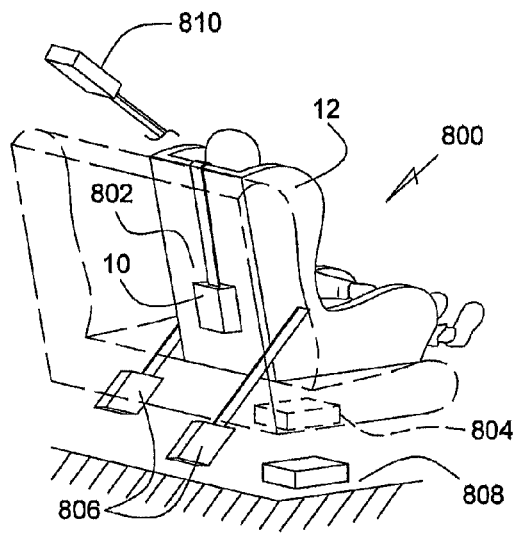
FIG. 50 illustrates a variety of mounting configurations in which one or more energy management anchorage devices may be positioned.

The components of the device 10 (and other devices herein) may be comprised of composite, metallic, or alternative material compositions suitable to satisfy functional performance requirements for an energy management restraint anchor device and maintain compliance to various automotive standards. It will also be appreciated that the embodiment of the FIG. 2 device, and various latter devices described or depicted herein, may also be configured for inspection and adaptation for re-use by replacing the load bearing deformable member 28 with new material. An indicator may be included to inform the occupant the device 10 has been deployed. It will further be appreciated that while a single energy management device 10 is shown in FIG. 1 in the context of being used with a top tether anchor arrangement interfacing with a child seat, a plurality of said devices may also be employed to further provide energy management restraint capability for lower anchor attachments as illustrated in FIG. 50 and 54, or a single device may be adapted to manage the energy and the displacement of multiple top tether and lower latch anchors, as depicted in various figures herein, such as FIGS. 53, 54, 55, 57, 58 and 59.

FIG. 3 illustrates a cross-sectional view of the anchor device 10 shown in FIG. 2 from the perspective of arrow 3-3. This section cut reveals the device 10 in a un-deployed, or inactive state, prior to the external application of sufficient loading imposed on anchor 22, to initiate the energy management functionality of the device. The interlocking members 32 incorporate an inward detent portion 44 disposed to contact interlocking engagement surfaces 38 within the window opening of retainer 20 providing a stop for the outer part 46 of the moveable load bearing member 30 to rest against. While not shown, a distortable membrane of the type shown in the embodiment of FIGS. 9 and 10 may be incorporated, disposed relative an interior of a retainer side wall 34, covering the window opening in the retainer to maintain a at least a first position of an interlocking member 32. Said first position may be one of initial disengagement from contact with moveable member 30. Said first position of interlocking member may permit a first position of moveable member directly adjacent to the window openings in the side walls of retainer 20 or biased towards the end wall of retainer 20, opposite the anchor end having openings 36. Movement of load bearing moveable member relative to the retainer wall causes distortion of the membrane, permitting the interlocking member to protrude through the window opening of retainer 20, enabling contact with moveable member 30 to control anchor movement and provide a second interlocked position between moveable member 30 and interlocking member position 32.

FIG. 4 illustrates a cross-sectional view of the device 10 in an active state, wherein the application of sufficient loading is imposed on anchor 22 to transfer enough energy to load bearing movable member 30 to exceed a predetermined threshold load value, thereby initiating the deformation of the energy absorption material(s) 28 and enabling the corresponding extraction of anchor 22 in the direction of the arrow. As compression of load bearing deformable member(s) 28 occurs, energy is absorbed, and the forces on the child 16 in child seat 12 (shown in FIG. 1) are managed. Management of the energy transferred to the child seat and to the child during anchorage extraction is achieved by controlling the anchorage displacement in combination with deformation of the deformable material(s) 28 as the child seat 12 translates forward, downward and may rotate into the vehicle seat 14 depicted in FIG. 1.

After the occurrence of a significant vehicle deceleration event causing the extraction of anchor 22, and corresponding deformation of energy absorption material(s) 28, the anchor 22 rebounds and retracts, enabling the child seat to be re-coupled with the vehicle seat. Retraction and subsequent interlocking of the anchor 22 is illustrated in FIG. 5 wherein the anchor 22 is shown in a retracted position and flexible anchor biasing or return assist members 26 bias the anchor in a direction opposite that of extraction, creating a void 50 within the internal cavity of the retainer. The void may exist permanently or temporarily, depending on the configuration of load bearing deformable member(s) 28 employed within device 10. While the flexible return assist members 26 are depicted as coil springs in this embodiment, in practical application such members may also vary in geometry and position within, or external to an enclosed retainer 20 or relative to the walls of a retainer that is not represented as an enclosure or housing. Additionally, while independent return assist members 26 may be disposed to control retraction, or to supplement the natural retraction and rebounding motion of, the anchor 22 in order to reach a secondary retracted and interlocked position, the independent return assist members 26 might be omitted from device 10 in instances where the combination of component geometries, material properties or orientation of device 10 in the vehicle and restraint system performance indicate adequate retraction is repeatably achievable without incorporation of a return assist feature. Furthermore, in some instances the load bearing deformable member(s) themselves, represented in the embodiment of the FIG. 2 device and various latter devices described or depicted herein, may additionally provide an anchor return assist capability operable to facilitate anchor retraction, by virtue of the inherent resiliency demonstrated in certain recoverable load bearing deformable members material properties. In such instances, the resiliency of the deformable member may supplement or replace the return assist capability that would otherwise have been provided by independent return assist members 26.

The moveable load bearing member 30 is shown interfacing intermediate connecting members 42 engaged with anchor 22, at the end opposite tether 24. In the rebound condition, the moveable member 30 retracts to a locked position, reliant upon contact with the detents 44 of the interlocking members 32 in order secure the position of anchor 22. One advantage of the present invention is provision of positive interlocking engagement of the retracted anchor 22 in order to restrain the anchor, reducing or preventing subsequent anchorage extraction after the child seat rebounds to re-engage the vehicle seat back 14, in the event of multiple instances of abrupt vehicle deceleration, a secondary impact, rollover or similar type of vehicle impact condition. Positive interlocking is especially advantageous in conjunction with designs incorporating expendable, non-recoverable load bearing deformable members 28 that create a resultant gap or void 50 between spent load bearing deformable member 28 and the moveable member 30 during the energy management phase of operation. The controlled resistance to extraction once provided by load bearing deformable member 28 is no longer offered after such permanent deformation occurs. It will be appreciated that members or mechanisms other than interlocking members 32 shown relative to device 10 may be employed to control anchor movement.

FIG. 6 illustrates a cross-sectional view of an energy management anchor device 10 wherein at least one alternative load bearing deformable member or energy absorption material 48 has been employed, the material being resilient, capable of recoverable, non-permanent deformation. Recovery may occur unassisted and naturally over time. Recovery may occur nearly instantaneously, or may occur gradually, as desired to achieve intended performance for a given functional application. Alternatively, the rate or the amount of total recovery may be supplemented through the use of spring-like assist features 26, which may also serve to additionally, or independently, supplement the retraction of the anchor 22 towards its initial pre-deployed position. Upon having been retracted, anchor 22 may be interlocked through engagement between moveable member 30 and detents 44 of the interlocking members 32 in order secure the position of anchor 22.

Alternatively, interlocking may not be desired in situations where eventual or immediate device reactivation and/or re-use capability are desired. It will be appreciated that a load bearing deformable member 48 may rebound or recover partially, or more completely as is illustrated in FIG. 6. Further, the load bearing deformable member may also be preloaded during manufacturing of device 10, or through end user interaction. In such instances, load bearing deformable member 48 may be permitted to recover completely when the anchor is retracted such that void 50 referenced in FIG. 5 is eliminated when the anchor is retracted and interlocking occurs. For example, the recoverable load bearing deformable member in FIG. 6 is shown having a greater geometry in a recovered and retracted position than in an initial position shown in FIG. 3. The rate of recovery of load bearing deformable member 48 and/or incorporation of anchor biasing or recovery assist features 26 will be dictated by the desired performance characteristics of a given application of the energy management anchor device 10. In its retracted and interlocked position, load bearing moveable member 30 may directly contact an inner surface 52 of an end wall 34 of retainer 20, or may be disposed to create a small void relative to surface 52. The load bearing moveable member 30, or interfacing contact surface 52, may include a sound dampening material or incorporate sound dampening features (not shown) such as felt tape, compression springs or the like to resist relative movement and noise.

FIG. 7 illustrates an alternative interlocking member configuration in association with an energy management device 60, a housing or retainer 62, at least one connecting member 64, a moveable member 66 and one or more spring mechanisms 68 operatively associated with one or more interlocking members 70 that are biased to extend from the load bearing moveable member 66, wherein interlocking members are disposed within one or more cavities 75. Interlocking member(s) 70 may be represented by spring biased tapered pins, as shown. Return assist members 26 (not shown) may be disposed to bias the anchor (not shown) prior to device activation, and/or incorporated as an aid to supplement the retraction of the anchor towards its initial position during rebound, as described in reference to the FIGS. 5 and 6 devices. Interlocking member(s) 70 are captured by interlocking engagement surface(s) 72 within housing 62, providing a stop for securing the moveable member 66, connecting member 64 and the restraint anchor, when sufficiently retracted. While interlocking engagement surfaces 72 are depicted as clearance holes in FIG. 7, engagement surfaces 72 may instead be represented by clearance pockets or detents that do not completely penetrate the wall of retainer 62, or by alternative geometries disposed on a wall surface of retainer 62 enabling similar functionality.

Figure 9:
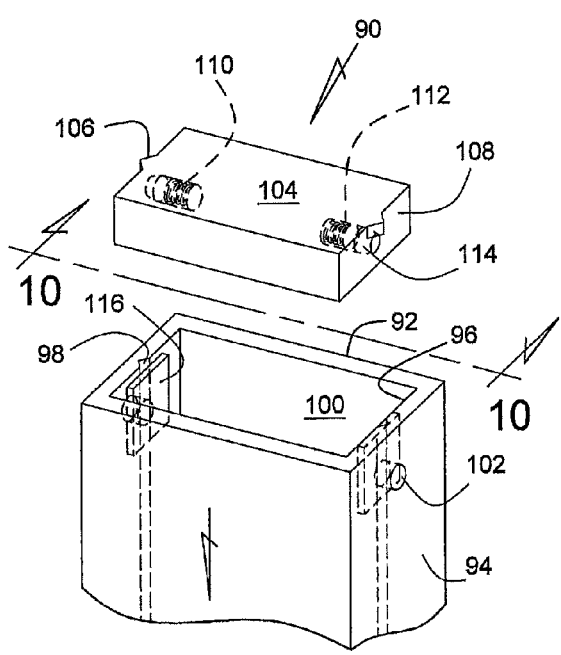
FIG. 9 illustrates an exploded view of an alternative interlocking engagement for an energy management device, having a moveable member with v-shaped portion that slides within a corresponding groove within the housing.
Figure 10:
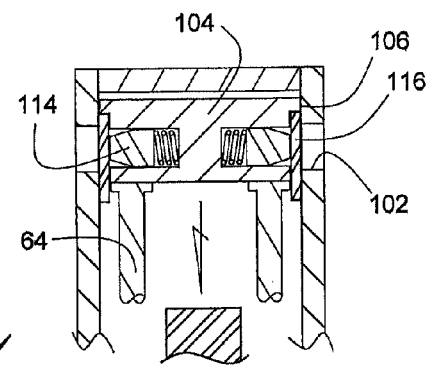
FIG. 10 illustrates a sectional view of the FIG. 9 embodiment, with the device assembled and ready for deployment.

Interlocking members 70, or the holes 72 in housing 62, may be initially covered by a thin walled distortable membrane material 74, such as aluminum foil. Material 74 can be locally affixed to the outer surface of load bearing moveable member 66 as depicted in FIG. 7, or to the inner wall of housing 62 as depicted in FIGS. 9 and 10, in order to mechanically secure interlocking members 70 in an initially retracted position. In such a configuration, interlocking members 70 may be initially disposed directly adjacent the engagement surfaces (or holes) 72 in retainer 62. As the load bearing moveable member 66 translates within a housing-like retainer enclosure or relative to at least one wall of a retainer 62 during the anchorage extraction phase, the direct frictional contact between penetrable membrane 74 and the inner wall of retainer 62, (or between the moveable member 66 and the penetrable membrane 74 if affixed to the inner wall of retainer 62), causes the distortable membrane to peel away or to become punctured, thus enabling the interlocking members 70 to be deployed for the purposes of engaging surfaces 72 upon retraction. Alternatively, one or more protrusions 73 extending from at least one inner wall surface of the retainer 62 may be disposed to displace or tear membrane 74 affixed to moveable member 66 as the anchor is extracted, releasing the spring biased pins 70 to interlock with engagement surfaces 72 upon retraction. Once engaged, this interlocking configuration precludes secondary extraction of the anchorage from its now fixed position. To release the load bearing moveable member 66 from a locked position, the interlocking members 70 may be displaced to disengage the ends from contact with the holes 72. This action releases the fixed anchor to permit displacement. This action might also be taken if the device is configured to incorporate a replaceable load bearing deformable member.

Interlocking members 70 contained within load bearing moveable member 66 may instead be configured to maintain a constant and direct frictional contact surface engagement with at least one inner wall surface of retainer 62 in a first position and as the moveable member is displaced relative to the retainer. Spring mechanisms 68 remain compressed as the anchor is extracted and retracted until the anchor and load bearing moveable member 66 are retracted sufficiently to permit interlocking members 70 to engage the clearance holes 72 in a second position. In such a configuration, wherein distortable membrane 74 and protrusion 73 have been omitted, the holes 72 may be disposed such that load bearing moveable member 66 interlocks in a second, slightly more retracted position, compared to the original pre-deployed position, in order to prevent interlocking member 70 from interlocking with engagement surfaces 72 during extraction.

FIG. 7 further illustrates a modification to device 60 to alternatively employ a sensor S, a control device C, and an actuator A in association with the retainer 62. The sensor S can operate to sense an abrupt change in vehicle acceleration or an impact condition and generate a signal $S_1$. The sensor may also detect the position of an anchor, or of a moveable member interfacing an anchor during extraction or retraction. The signal $S_1$ is transmitted to a control device C that causes an actuator to displace one or more interlocking members 70. Actuator A may be represented by a magnet/electromagnet, solenoid, motor, or other device imparting a charge or otherwise facilitating displacement of interlocking member(s) 70. Distortable membrane 74 and protrusion 73 in retainer 62 may be omitted. The actuator may be configured to deploy an interlocking member 70 to interlock with an engagement surface 72, fixing the position of the moveable member 66, controlling the movement of the corresponding anchor. The actuator may additionally (or alternatively) be configured to displace or retract an interlocking member 70 in order to disengage said member from contact with surface 72, thus freeing the movable member 66 and the corresponding anchor. Spring mechanisms 68 may be included to bias the position of the interlocking members in certain configurations, and omitted in others where an actuator controls the full range of functional positions of the interlocking members. The above described sensor-controller-actuator based functionality provides a device having a tunable, dynamic anchor displacement and energy management control interlock that may be incorporated to provide distinctly different device performance under dynamic and quasi-static loading conditions. Said functionality further enables device 60 to satisfy the aforementioned FMVSS regulations.

It shall be noted that in reference to FIGS. 7, 9 and 10, alternative embodiments may employ an inverse component relationship wherein interlocking members 70 and spring mechanisms 68 are disposed within one or more walls of retainer 62 in order to interlock with engagement surfaces 72 alternatively disposed in moveable member 66. The foregoing references to incorporation of distortable membranes 74, protrusions 73, a sensor S, a control device C, and/or an actuator A may be adapted to achieve the same aforementioned functionality in such alternative configurations of device 60. Similarly, sensor S, control device C and actuator A may be incorporated in association with other interlocking engagement configurations in association with various devices described or depicted later herein.

Figure 8:
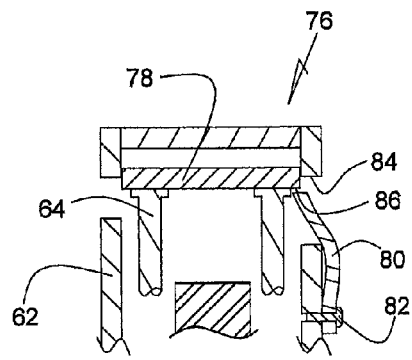
FIG. 8 illustrates a cross section view of an alternative interlocking engagement for an energy management device incorporating a spring clip feature for securing the position of the moveable member and corresponding restraint anchor(s)

FIG. 8 illustrates another alternative interlocking engagement anchor design for an energy management device 76. The device 76 includes a housing, or retainer 62, at least one connecting member 64, a moveable load bearing member 78, and at least one interlocking member 80. Interlocking member 80 may take the form of a spring biased tab or clip, may be made of spring steel, or may be alternatively configured from a suitable material incorporating adequate flexibility to be displaced by the moveable load bearing member 78 during rebound and retraction. The interlocking member 80 further exhibits adequate structural integrity to interlock and maintain the position of the moveable load bearing member 78, connecting member 64 and the anchor (not shown) under a secondary loading condition, wherein the deformable material may have been expended, for example. Fastener 82 may be incorporated to retain interlocking member 80. Alternatively, interlocking member 80 may be configured to be integral to a component of the retainer 62, rather than a separately affixed component. Interlocking member 80 is operable to maneuver within window 84 to engage surface 86 of the moveable member 78, collectively operating as a stop to secure the moveable member 78 in place, thereby fixing the position of the anchor attached to moveable member 78 interfacing with connecting member 64. The interlocking configurations depicted in FIGS. 2 and, 8 generally operate to minimize or reduce secondary extraction of the anchor to which a child seat is attached in a vehicle. The device may be configured for reuse. In order to reset the device 76, the interlocking member 80 may be displaced in an outward direction with respect to the retainer, thus allowing the outer tip of the interlocking member 80 to be drawn away from the moveable load bearing member 78. A distortable membrane (not shown) may be incorporated to control at least a first position of interlocking member 80. A sensor, controller and actuator may be adapted to control interlocking relationship of device 76.

FIG. 9 illustrates another alternative energy management device 90. The device 90 includes a retainer 92 shown having side walls 94 and interior walls 96. Interior wall 96 has a generally axially extending clearance channel 98 in one or more interior walls 96 of interior cavity 100 of retainer 92. Retainer 92 incorporates one or more detents, apertures or engagement surfaces 102, operable to receive one or more interlocking members 114. The device 90 further includes a moveable load bearing member 104 capable of being displaced within cavity 100. The moveable member 104 includes a protrusion 106 that extends along a portion 108 of an outer wall of member 104 and is operable to be received within the clearance channel 98 of interior cavity 100. The moveable load bearing member 104 is moveable within the interior cavity 100 of retainer 92 and slides axially relative to the clearance channel 98. A distortable membrane 116 is shown, affixed to side wall 94 of retainer 92. Retainer 92 need not necessarily be represented by an enclosure-like housing encapsulating the interior components of device 90.

The moveable load bearing member 104 includes at least one interior cavity 110 that receives a spring 112 and an interlocking member 114 that act in concert with one another to slide within the interior cavity 110 of moveable member 104. Interlocking member 114 is represented by a pin in FIG. 9. The geometry of interlocking member 114 may be altered while achieving the same functional performance. Member 114 is operable to be received by a corresponding engagement surface, detent or aperture 102 to act as a stop, securing the position of moveable member 104 when retracted. Distortable membrane 116 may be oriented to cover engagement surface or aperture 102 and clearance channel 98 in order to preclude premature deployment of the interlocking member 114 into aperture 102. Membrane 116 can be made of foil or an alternative suitable material capable of being sufficiently penetrated or displaced by protrusion 106 to enable member 114 to engage surface 102.

Clearance channel 98 may extend substantially along the length of retainer 92 or may extend only a short distance sufficient to permit adequate penetration or displacement of membrane 116 and enable interlocking member 114 to engage surface 102. Surface 102 and member 114 may be alternatively configured to be represented by geometries other than a clearance hole and corresponding round pin. Channel 98 may be configured to extend axially as shown, or in the direction of anchorage extraction if extraction occurs off axis, with respect to the retainer side walls. One or more channels 98 and protrusions 106 may be represented by alternative interfacing geometries sufficient to enable protrusion 106 to penetrate or displace membrane 116, said geometries being represented by other than a v-shaped notch and a corresponding keyed v-shaped protrusion. As an alternative to channel 98 being axially aligned with the recessed engagement surface 102, one or more protrusions 106 and channels 98 may be oriented such that the travel path of a protrusion 106, relative to a channel 98, is adjacent to the recessed engagement surface 102, wherein protrusion 106 remains capable of sufficiently penetrating or displacing membrane 116 during retraction to enable interlocking members 114 to engage surfaces 102 when the anchor is retracted.

FIG. 10 illustrates a sectional view 10-10 taken from FIG. 9, wherein device 90 is shown in a static condition with the membrane 116 maintaining the interlocking member 114 in a compressed state. As the moveable member 104 traverses in the direction of the arrow, protrusion 106 penetrates or displaces membrane 116 thus exposing the engagement surfaces or apertures 102. When the movable member retracts, interlocking members 114 are permitted to engage surfaces 102, thereby locking the anchor in place. It will be appreciated that the device 90 employs other components discussed in the other figures herein, such as deformable material, at least one connecting member 64 interfacing to load bearing moveable member 104 and a restraint anchor. Device 90 may include one or more anchor biasing elements and may be adapted to include a sensor, controller and actuator.

Figure 11:
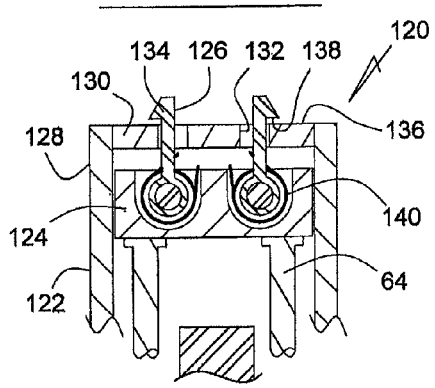
FIG. 11 illustrates a sectional view of an alternative interlocking engagement for an energy management device incorporating interlocking members that extend through the housing end opposite the anchor.

With reference to FIG. 11, an alternative energy management device 120 includes a retainer 122, relative to which a moveable load bearing member 124 and at least one interlocking member 126 are positioned. Such features as the aforementioned load bearing deformable member 28, anchor 22, connecting member 64, and return assist members 26, not all of which are redrawn in FIG. 11. The retainer includes side walls 128 and an end wall 130. The end wall 130 includes openings 132 that are operable to receive a portion of the interlocking member 126. Interlocking member 126 is connected with moveable member 124 and includes one or more extension arms 134 that are operable to engage surface 136 of the retainer end wall 130. A contact portion 138 of arm 134 is operable to engage surface 136. Springs 140 generally bias arms 134 in the direction of engagement between portion 138 and surface 136. The orientation of interlocking members 126 and the contact portions 138 in FIG. 11 may be amended such that the contact portions 138 face one another, face in opposite directions or may be asymmetrically oriented if so desired. The arms 134 are pivotally connected at one end to a portion of the moveable member 124. The spring 140 interfaces between the pivotally connected end of the arm 134 and the moveable member 124 so as to impart its biasing force upon the arms 134. To disengage the arms 134 of interlocking member 126 from the end wall 130 of the retainer, the end of arm 134 having the contact portion 138 may be displaced against the spring bias force, thus allowing the moveable member 124 to be disengaged from end 130 and the anchor to again be displaced.

It will be appreciated that interlocking members 126 may be rigidly affixed or integral to the moveable member 124, or may be pivotally attached to member 124 as shown. The interlocking member 126 may be configured to displace momentarily, relative to a first disengaged position, in order to enable the interlocking member to pass through the aperture and just beyond the interlocking engagement surface 136 of the retainer 122, before engaging surface 136 in a second, engaged position. This may be achieved employing a semiflexible interlocking member 126 that is rigidly engaged with moveable member 124, or by incorporating a spring-like mechanism to bias rigid interlocking member, pivotally engaged with member 124 as shown. An interlocking contract relationship may be represented by a hook-like catch portion of an interlocking member passing through a clearance aperture and engaging an exterior surface of the retainer as shown, or instead be represented by a catch portion of the interlocking member engaging the surface of a recessed pocket disposed in end wall 130 to become interlocked. A sensor, control device and actuator(s) may be incorporated to control movement of interlocking components, as discussed in reference to FIG. 7, wherein an actuator facilitates the displacement of interlocking member 126, causing contact portion 138 of arm 134 to engage or disengage surface 136 of retainer 122. Such a configuration may be especially beneficial in association with a device 120 that incorporates one or more recoverable load bearing deformable members. A mechanical device 120 may also be configured such that the contact portion ends 138 of interlocking members 126 are initially recessed within openings 132, or ends 138 may be positioned proximate to the interior surface of end wall 130 (opposite surface 136), in a first static position to assure prevention of interlocking engagement before an anchor has been permitted to extract. Such configurations may be especially beneficial for expendable one-time use, limited use/re-use devices or for devices that incorporate replaceable deformable materials and may be resettable. It is further noted that the interlocking engagement relationship may instead be represented by the inverse condition in which the interlocking members are disposed on end wall 130 of retainer 122 and interlocking engagement surface 136 is instead disposed on the moveable member 124 itself. Further, the interlocking may be achieved by alternative means such as through the use of magnets.

Figure 12:
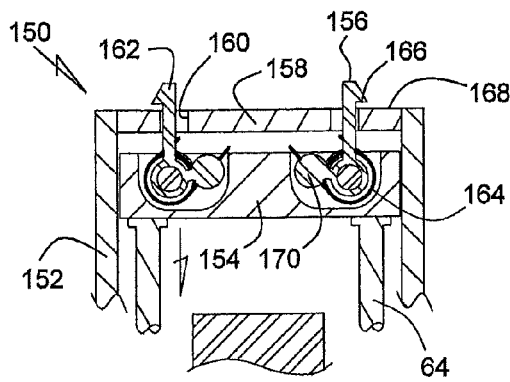
FIG. 12 illustrates an alternative interlocking engagement for an energy management device incorporating a biased mass dynamic interlock feature engaging an end wall of a retainer.

With reference to FIG. 12, an alternative energy management device 150 includes a retainer 152, a moveable load bearing member 154 and one or more interlocking members 156. The retainer 152 includes an end wall 158 having one or more apertures 160 for receiving a portion of the interlocking member 156. Interlocking members 156 include one or more extension arms 162 that extend away from the moveable member 154. The upper portion of the arm 162 includes a contact portion 166 that engages the upper surface 168 of the end wall 158. Contact portion 166 is depicted by a hook-like catch feature in FIG. 12 but may differ in practical application. Interlocking members may be pivotally connected to the moveable member by a rod, pin, screw or the like. A spring 164 is shown, operable to bias the opposite end of arm 162 towards engagement with surface 168 of retainer end wall 158. An offset mass 170 is shown associated with arm 162 of interlocking member 156. Members 156 depicted in FIG. 12 have an L-shaped configuration with mass 170 and hook shaped contact portion 166 at opposite ends.

Device 150 may employ a similar deformable material 28 or 48 in association with retainer 152, and may also include interfacing connecting member(s) 64 and anchor 22 as discussed above in reference to such Figures as FIG. 2 and FIG. 6. Accordingly, these features will not be discussed again.

When inertial forces of sufficient magnitude are imposed on device 150, as the result of an abrupt vehicle deceleration or a vehicle impact condition, the mass 170 is displaced, overcoming the biasing force of spring 164. Arm 162 of interlocking member 166 is then permitted to rotate, disengaging contact portion 166 from surface 168. The moveable member 154 and corresponding anchor are then permitted to be extracted in the direction of the arrow if the loads imposed on the restraint anchor are sufficient to initiate distortion of the deformable material. It will be appreciated that one or more anchor-biasing/return assist members or recoverable deformable materials described in reference to the device of FIGS. 2 and 6, respectively, can be employed to bias moveable member 154 towards retainer end wall 158, opposite the direction of the arrow. Return assist capability may facilitate returning the moveable member 154 and associated restraint anchor (not shown) to retracted, initial positions shown in FIG. 12. Moveable member 154 may re-engage and become interlocked with end wall 152, precluding the associated anchor from subsequently extracting until sufficient inertial and anchor loading forces are again imposed device 150, mass 170 and the anchor.

It will be appreciated that the inertial release system depicted in FIG. 12 can have the mass 170 associated with the arm 162 in a variety of configurations. For example, the mass 170 could be positioned elsewhere relative to contact portion 166 of the interlocking member arm 162, so long as it provides the intended inertial release functionality allowing the arms 162 to disengage the end wall 158.

The interlocking engagement relationship of device 150 may instead be represented by the inverse condition in which the interlocking members are disposed on end 158 of retainer 152, and corresponding interlocking engagement surface 168 is disposed on the moveable member 154 itself.

Figure 13:
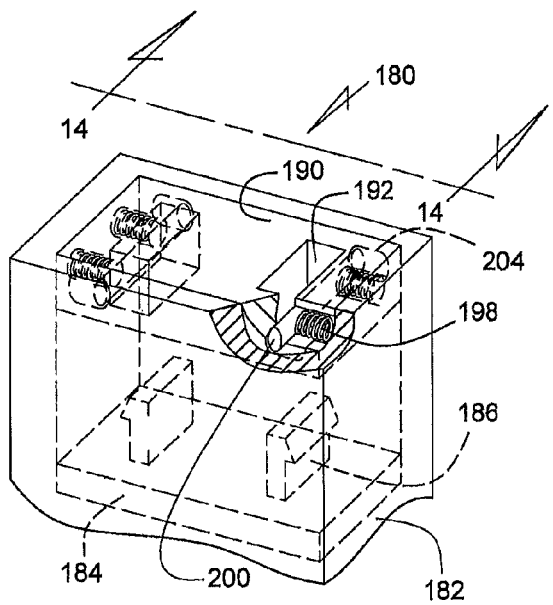
FIG. 13 illustrates a perspective view of an alternative interlocking engagement for an energy management device utilizing a spring-biased rod that engages an interlocking member.
Figure 14:
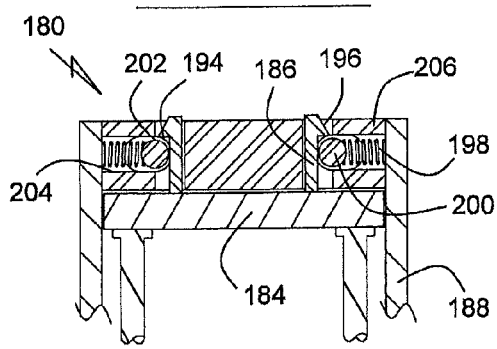
FIG. 14 illustrates a sectional view of the FIG. 13 device, showing the interlocking member in a locked position, the interlock proximate to an end of the device retainer opposite the anchor.

With reference to FIGS. 13 and 14, an alternative energy management device 180 includes a retainer 182, a moveable load bearing member 184 interfacing with a restraint anchor (not shown), and at least one interlocking member 186. The retainer includes side walls 188 and an internal cavity 190 that is operable to receive the load bearing moveable member 184. The aforementioned interlocking members 186 may be integral or permanently affixed to moveable load bearing member 184, relative to the end of member 184 that faces retainer end plate or wall 206. A contact portion 194 of interlocking member 186 is operable to contact an engagement surface 202 of a moveable load bearing retention member 200. At least one spring 198 and retention member 200 are located in close proximity to end wall 206, or within end wall 206 of the retainer 182 as shown. The retention member 200 may extend across the majority of the width of the retainer and translate within a channel 204 disposed within an end wall 206 or side walls 188 of retainer 182. Member 200 may also be configured to span a shorter distance within an end wall. Spring 198 biases the retention member 200 within channel 204, in the direction of engagement with interlocking member 186.

FIG. 13 illustrates moveable member 184 in a first position, disengaged from the retainer end wall 206 and the corresponding components shown contained therein. (FIG. 14 clearly identifies end wall 206). FIG. 14 illustrates a section 14-14 through device 180 taken from perspective shown in FIG. 13. FIG. 14 depicts the moveable member 184 in second interlocked position, wherein the position of the corresponding restraint anchor is fixed. Relative to said first position, surface 196 of interlocking member 186 of FIG. 14 has displaced retention member 200 within channel 204, overcoming the biasing force of spring 198 as the moveable member 184 and interlocking members 186 move towards retainer end wall 206 during the anchorage retraction phase of device operation. The biasing force of spring 198 causes retention member 200 to again translate within channel 204 to facilitate contact between portion 194 and engagement surface 202, immediately after surface 196 of interlocking member 186 is relieved of contact with engagement member 200. Interlocking is achieved when contact portion 194 of interlocking member 186 is permitted to interface with engagement surface 202 of retention member 200. It will be appreciated that device 180 also incorporates one or more deformable material members and may further include anchor biasing elements and other functional hardware described in reference to aforementioned figures.

In an alternative configuration, interlocking members 186 can be affixed to the end wall 206. The spring biased retention members 200 and springs 198 may be disposed within, or attached externally to, the moveable member 184. In this version, the moveable member may require inclusion of apertures or cavities for receiving the contact portion 194 portion of the interlocking members 186.

For illustration purposes, the interlocking member contact portion 194 is represented by a hook-like geometry engaging a rod-shaped retention member 200. It is appreciated that the interfacing geometries of these components may be varied while achieving the same functional performance. Additionally, a sensor, control device and actuator(s) may be incorporated to provide the function described in reference to FIG. 7, wherein an actuator facilitates displacement of interlocking or retention members to control anchor movement. Device 180 may be configured such that the contact portions 194 of interlocking members 186 are either partially recessed within clearance openings 192 in end wall 206, or entirely disengaged from contact with end wall 206, in a first condition, to ensure the displacement of an anchor is not restricted by interlocking engagement relative to a second condition, wherein anchor extraction is desired. A third condition may be represented as a retracted and interlocked position. If channel 204, retention member 200 and springs 198 are disposed relative to said side wall 188 instead of end wall 206, said first condition may be represented by positioning moveable member nearer the anchor end of said device, whereby interlocking member 186 initially disengaged from retention member 200.

Figure 15:
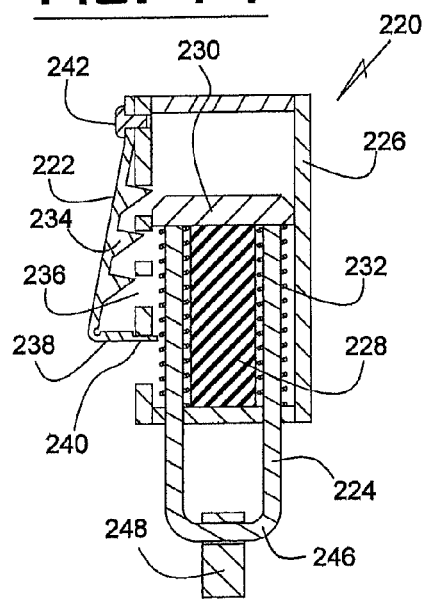
FIG. 15 illustrates a sectional view of an energy management device utilizing a spring strip interlocking configuration, the spring strip shown in the disengaged position.

With reference to FIG. 15, a cross-sectional view of another alternative interlocking engagement configuration is shown, wherein energy management device 220 incorporates at least one contact strip interlocking member that releases from an initial resting position, after having been dislodged by the moveable member during anchor extraction. Once released from a pre-deployed position, engagement of the interlocking member is permitted to occur with a plurality of corresponding incremental interlocking engagement surfaces as the moveable member and restraint anchor rebound or retract. This interlocking engagement of the moveable member during rebound minimizes extraction of the anchor in the event of subsequent abrupt vehicle decelerations, or secondary impact or rollover events. Such functionality may be beneficial relative to an energy management restraint anchor device incorporating slow recovery or non-recoverable deformable materials, or a device having an anchor that retracts partially during rebound, relative to an initial position.

The device 220 includes at least one contact strip interlocking member 222, one or more connecting members 224, a retainer 226, at least one load bearing deformable member 228 and a moveable member 230. The device may additionally incorporate one or more flexible return assist members 232 that may also initially bias an anchor 246. The contact strip interlocking member 222 has a plurality of interlocking engagement features 234 that are operable to be received within openings 236 in retainer 226. At least one intermediate chock 238 may be disposed at the anchor end of interlocking member 222, causing the interlocking member and corresponding engagement features 234 to rest offset from engagement with retainer 226. Chock tip 240 is shown resting against the anchor retainer 226. Chock 238 is also depicted in FIG. 15 as an integral feature of interlocking member 222. Chock 238 is displaced from engagement with retainer 226 when struck by moveable member 230 during the anchor extraction phase of the device operation. Displacement of chock 238 enables engagement of the interlocking member 222 with the retainer 226.

Contact strip interlocking member 222 may be comprised of a material having inherent spring-like material property characteristics, such as spring steel, and be held in place by at least one fastener 242 securing it to the retainer. As such, member 222 would have adequate flexibility to dynamically spring into a position of contact with the retainer after being released from an offset position when chock 238 is dislodged by moveable member 230 during anchorage extraction. Member 222 may further be displaced in an opposite direction to permit the moveable member to ratchet past one or more interlocking engagement features during retraction, for the purpose of retaining moveable member 230 and to prevent additional anchorage extraction. Material properties and component feature geometries would be selected to ensure member 222 is also sufficiently rigid when positioned to maintain positive interlocking engagement between moveable member 230 and interlocking engagement features 234. Alternatively, contact strip 222 may be generally rigid, wherein it may be released from an offset position to permit interlocking engagement features 234 to retain moveable member 230, by adapting device 220 to incorporate a mechanical hinge and spring assist feature disposed at the end opposite chock 238. Such a configuration would then facilitate rotation of a rigid interlocking member 222 into a position of engagement with moveable member 230.

Chock 238 may instead be represented as a separate, intermediate component disposed to initially separate interlocking member 222 from contact with retainer 226. An independent chock may be displaced by sliding, rotating or otherwise disengaging from contact with one or the other or both of the retainer 226 or contact strip 222 upon being dislodged by moveable member 230. However, the chock should operate to provide the same basic function whether integral or not. It should also be noted that interlocking engagement features 234 may take the form of teeth (as shown) or employ alternative geometries to provide the same function. The quantity, spacing, geometry and location of the openings 236 and interlocking engagement features 234 may be varied from that depicted. Further, the geometry, mounting location or orientation of the chock 238, the contact strip interlocking member 222, and corresponding interlocking engagement surfaces 234 and openings 236 may deviate from that depicted while still achieving the desired functional performance. Device 220 may be alternatively configured to permit displacement of chock 238 during the anchorage retraction phase instead of the extraction phase. The initial design position of chock 238 may differ from that shown in FIG. 15. An initial position closer to the anchor end of device 220 requires the anchor extract further to initiate incremental retraction interlocking capability. An initial position farther from the anchor end of device 220 requires less anchor displacement to enable incremental retraction interlocking capability.

Figure 16:
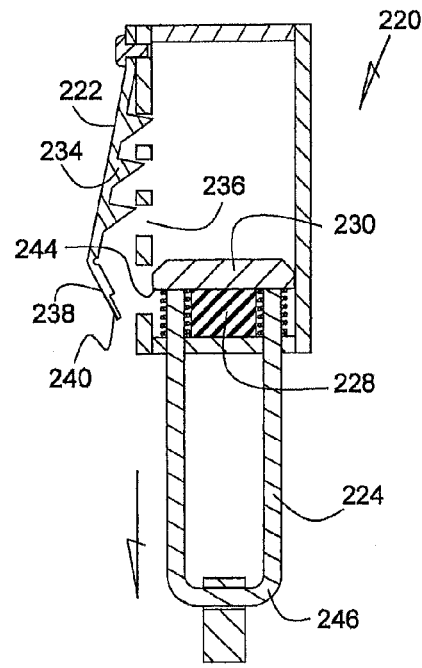
FIG. 16 illustrates the FIG. 15 device in the intermediate condition wherein the anchor has been extracted, the deformable member compressed, and the spring strip chock disengaged.

FIG. 16 illustrates a cross-sectional view of the device 220 in which the chock 238 has been disengaged from its initial position. This occurs as a result of contact made by the outer surface 244 of the moveable member 230 as it engages the tip 240 of chock 238 when anchor 246 is extracted (see arrow) and as the deformable material 228 is deformed. This action allows the interlocking engagement features 234 to enter the openings 236 when contact strip interlocking member 222 collapses to engage retainer 226.

With reference to the cross-sectional view in FIG. 17, the anchor 246 is shown in a partially retracted position. The retraction of anchor 246 during rebound may be supplemented by anchor biasing return assist members 232. Anchor 246 may be permitted to retract after a predetermined amount of deformation of energy absorption material or load bearing deformable member 228 has occurred. Following initial anchorage extraction, the child seat, being connected to anchor 246 by way of child seat attachment clasp, clip or claw-like mechanism 248, re-engages or rebounds towards the vehicle seating surfaces. During the rebound and anchorage retraction phase, surface 245 of moveable member 230 may incrementally displace interlocking member 222 (having engaged retainer 226) when contacting the successive ramp-like surfaces 243 on interlocking engagement features 234. Surface 244 of moveable member 230 contacts an interlocking engagement surface 250 on one of the interlocking engagement features 234, thus creating a positive stop for the moveable member relative to the interlocking member. The anchor 246 is now prevented from being re-deployed, thus preventing subsequent extraction. Such a configuration may be especially preferred for a device in which at least one non-recoverable load bearing deformable member is incorporated and/or full retraction of an anchor to its pre-deployed position may not occur.

Incremental interlocking may be incorporated for the purpose of capturing and maintaining the maximum amount of achievable retraction as a child seat rebounds and re-engages the vehicle seat to correspondingly minimize subsequent anchorage extraction. The load bearing deformable member 228 depicted in this embodiment has no memory or resiliency and is non-recoverable. It will be appreciated that one or more load bearing deformable members 228 could be employed having memory, being capable of recovering some or all of the initial geometry and load carrying capability after having initially been deformed, whether or not the anchor is capable of full retraction in a given application. Additionally, while not shown, a deformable material could alternatively be configured to manage energy through extension rather than compression, being operatively associated with the anchor 246 and/or moveable member 230 and at least one interfacing connecting member 224, and still incorporate interlocking characteristics described relative to FIGS. 15, 16 and 17.

In order to reduce the complexity of FIGS. 18 through 59, the aforementioned interlocking features are not illustrated, but may be included in association with the remaining embodiments depicted or otherwise described herein. The aforementioned fixed position or incremental interlocking features and functionality, having been incorporated to control a first or second position of an anchor, or to reduce or eliminate subsequent anchorage extraction after deformation of one or more load bearing deformable members has occurred, may be adapted to apply to the devices or systems of the FIG. 18-59 embodiments.

As shown in FIG. 18, an alternative energy management device 260 has retainer 262, end walls 264, a moveable load bearing member 266, a connecting member 268 and a looped anchor portion 276 disposed at the end opposite moveable member 266. Moveable member 266, connecting member 268 and anchor portion 276 may be integrally formed as a single component, or be represented by any combination of integral or individual components secured to one another, capable of performing the same intended function. One or more load bearing deformable members 272 is provided. Members 272 may be comprised of one or more continuous extendable or compressible accordion-like load bearing materials, or a plurality of components such as Bellville washers stacked in series with one another, operable to be deformed relative to the displacement of the moveable member 266 in connection with the extraction of the anchor portion 276. Retainer 262 may be cylindrical, rectangular, or have an alternative geometry.

Incorporating a plurality of load bearing deformable members 272 may enable additional design flexibility, further enhancing the functional tunability of device 260 by incorporating combinations of members having different deformation and displacement characteristics to achieve application-specific load redistribution and anchor displacement performance characteristics for a given energy management restraint anchor device. The accordion-like flexible members, or flex washers, 272 are shown in an un-deformed state. A child seat attachment component such as a tether hook, clip, clasp or claw like engagement mechanism 274 is connected to the loop shaped anchor portion 276. The geometries, orientations and quantities of the components of device 260 may vary from that depicted in FIG. 18, while still achieving the desired functional result.

With reference to FIG. 18, an indicator 270 is incorporated, operable to be detected by an occupant for the purposes of indicating anchor extraction has occurred. The presence of such a visual indicator may suggest the device 260 has been activated, indicating the energy management device, or a component of the device, may need to be reset, inspected or replaced. An indicator may be included to alert a user of any of a number of possible actions that may be, or may have been, taken in the event of, or as a result of an anchorage having been extracted. Indicator 270 may be brightly colored.

Indicator 270 is contacted by surface 269 of member 267. Contact surface 269 provides a reaction surface against which indicator 270 may rest against while being displaced to exit clearance aperture 263 in retainer 262 as the anchor is extracted. At least a portion of the indicator 270 may remain visible from the exterior of retainer 262 after anchor 276 is retracted. The indicator may remain fixedly engaged with aperture 263 as anchor 276 retracts. Or the indicator may instead be pushed through the aperture 263 during extraction and remain attached to connecting member 268, external the end wall 264 of the retainer when the anchor retracts. Member 267 may be omitted and surface 269 of member 267 may instead be represented by a wall surface of moveable member 266. Or, member 267 may be affixed or integral to connecting member 268, positioned elsewhere along its length to enable detection of indicator 270, after experiencing any predetermined, minimum amount of anchorage extraction. The location of surface 269 may be altered. The location of surface 269 corresponds to the minimum amount of anchor displacement required to expose indicator 270 to a user. Member 267 may also be affixed or integral to, or otherwise in contact with, at least one of the individual flexible load bearing deformable members 272 shown in this embodiment, and ejected from the retainer as a result of corresponding displacement of member(s) 272. The mounting locations, orientations and geometries of indicator 270, aperture 263, surface 267 and member 269 may be altered in practical use to achieve the same functional result, to increase visibility, obviousness, likelihood of detection or to extract and/or retract in harmony with the anchor in order to indicate any of a variety of functional or post-deployment status conditions recognizable to the end user.

FIG. 19 illustrates the energy management device 260 of FIG. 18 with the anchor loop 276 in an extracted position and wherein one or more accordion-like flexible members, or flex washers, 272 are compressed as the connecting member 268 displaces moveable member 266 in conjunction with the extraction of anchor 276, in the direction of the arrow. The members 272 may be operable to re-expand as the anchor retracts and child seat rebounds towards the vehicle seat during rebound. The child seat is attached to the vehicle child anchor by a child seat attachment hook, clasp, clip or claw-like mechanism 274.

FIG. 19 illustrates indicator 270 in an exposed position, visible from the exterior of the retainer of device 260. Also shown is another type of alternative indicator system 275 that includes a switch or sensor 277, signal 278 and indicator 280. The sensor or proximity switch 277 may be located relative to the moveable member 266 for sensing a deployed condition or change in the operational state of device 260. The switch 277 transmits a signal 278 to an indicator 280 providing notice of a predetermined condition. Such conditions may include, but are not limited to, partial or total extraction of an anchor, complete or partial retraction of an anchor, hardware or system functional readiness detection, a need reset, inspect or replace a device or component of the device, etc. The indicator 280 may provide notice to one or more occupants by way of communication with a vehicle audio notification system and/or a visual vehicle display, or be otherwise incorporated within the vehicle so as to advise the driver or occupants of the functional or post-deployment status of device 260. It will be appreciated that the indicator system 275 could be deployed with any of the energy management devices or systems disclosed herein and could be electrical or mechanical in nature.

FIG. 20 illustrates an alternative energy management device 290 that employs one or more load bearing deformable members or energy absorption materials 292, different in composition from that shown in the FIG. 18 embodiment. The device 290 may include one or more return assist members 294 that encapsulate at least one connecting member 296, and which may additionally provide a biasing action against the moveable member 298. The load bearing deformable member 292 may be comprised of any of a variety of non-recoverable energy absorption materials, or of an alternative material that provides sufficient resiliency and memory to enable partial or complete recovery of its initial geometry and load carrying capabilities, satisfactory to meet the needs of the specific application at hand. Geometries of components shown may differ from that depicted in FIG. 20 as necessary for practical implementation.

FIG. 21 illustrates the FIG. 20 device 290 in an at least partially deployed position. The load bearing deformable member 292 is at least partially compressed and the anchor 300 has been extracted. An indicator 302 is included as a visual aid to alert occupants when the device 290 has been deployed. The indicator may also be exposed to alert occupants of alternative conditions such as incomplete anchorage retraction or other functional device state conditions. For illustration purposes, the indicator 302 in FIG. 21 is represented by a flexible member that may be made from such materials as cloth, plastic, foil, thin walled spring steel, or other suitable materials. Indicator 302 may be brightly colored. Prior to anchorage extraction, as shown in FIG. 20, the indicator 302 may be positioned between the connecting member 296 and the return assist member 294 along the axial length of the connecting member 296. Indicator 302 may have an initial stowed position that differs from that represented in FIG. 20, shown for illustration purposes.

It will be appreciated that an alternative form of visual indicator may be used in lieu of a mechanical member extending from a device retainer, or affixed to a connecting member or anchor, proximate to device 290. A display lamp may incorporated and may be disposed directly on, proximate to, or at a distance from device 290, such as within a vehicle display. Similarly, an audible notification system may be implemented proximate to the restraint device, or the switch 277 may be in communication with a vehicle notification system or display within the vehicle wherein the driver or other occupants of the vehicle may experience an audible or visual signal representing said indicator. In addition, both visual and audible indicators could be used in tandem. The mounting position, length, flexibility and material composition of a mechanical indicator 302 may be altered to increase rigidity, visibility, obviousness, likelihood of end user detection, or to extract and/or retract in harmony with the anchor in order to indicate any of a variety of functional or post-deployment status conditions beneficial to the end user. It will be appreciated that indicator 302 could be included with any of the energy management devices or systems disclosed herein.

For alternative embodiments of the device shown in FIGS. 20-21, one or more recoverable deformable material members 292 may be utilized, further providing a biasing action against moveable member 298 in combination with anchor biasing return assist member 294. Member 292 may provide sufficient anchor biasing/return assist capability to permit member 294 to be omitted from device 290. It shall also be noted that return assist members 294 may be configured to reside within or external to the retainer of device 290. Connecting member 296 need not necessarily be encapsulated by return assist member 294. Retraction interlocking may be incorporated or omitted in certain instances, such as where resilient load bearing deformable members 292 may be utilized, depending on the application and desired function of device 290. Return assist members 294 capable of storing energy may be used to replace, or to supplement the performance of, load bearing deformable member 292, or may be utilized to assist in the expedited recovery of a resilient load bearing deformable member 292 for embodiments depicted in FIGS. 18-21.

FIG. 22 illustrates an alternative energy management device 320 that employs an alternative visual indicator that may be used to indicate the anchor of device 320 has been deployed, or to identify an alternative functional state of device 320. The device 320 includes a retainer 322, a moveable member 324, at least one connecting member 326, an anchor 328 and an indicator 330. The retainer 322 has an end wall 332 with at least one aperture 334 providing a passageway for a corresponding connecting member 326 to extend therethrough. An additional aperture 336 provides a clearance for the indicator 330 to pass through as anchor 328 is extracted. The indicator 330 includes an elongated portion 338, a stop 340 and an interlock 342 which is operable to engage an exterior wall surface 344 of the retainer 322.

With reference to FIG. 23, a section view 23-23 of the device of FIG. 22 is shown, wherein the anchor has been deployed, the indicator 330 has passed through aperture 336 and interlock 342 has engaged the retainer wall surface 344. The anchor 328 and movable member 324 have retracted, leaving the indicator 330 engaged with the wall of retainer 322. The moveable member 324 and indicator 330 initially traverse in conjunction with one another in the direction of anchorage extraction. The indicator 330 may initially rest against a flat, or recessed, surface of moveable member 324. Indicator 330 may instead be temporarily attached to moveable member 324 using a mild adhesive, having a break away connection or alternative means of maintaining a non-structural engagement between the two components. In either case, indicator 330 detaches from engagement with moveable member 324 as stop 340 and interlock 342 become engaged with retainer end wall 332, generally at the transition between the anchor extraction and retraction phases of device operation.

A load bearing deformable member was not illustrated in the FIG. 22 or FIG. 23 embodiment to simplify the Figures, though one or more of such members may be included in device 320, as previously mentioned in the discussion of prior devices. It will also be appreciated that the indicator 330 may be configured to interfere with the anchor 328 such that the elongated portion 338 inhibits an end user from reattaching a child seat to an anchor that has been deployed, or to indicate service is required, that a device must be inspected, reset or that the device or components may require replacement. A configuration like this may be especially beneficial for devices 320 having expendable deformable members or which require user interaction for resetting or to indicate service/replacement is necessary. Interlock 342 is illustrated having Christmas tree-like configuration. It will be appreciated that other geometries may be employed. Similarly, the indicator 330 may also be represented by alternative geometries and disposed to exit the retainer in alternative locations. For example, the indicator 330 shown may be adapted to exit retainer 322 through an aperture 336 that is offset from the generally centrally disposed location shown in FIGS. 22 and 23, whether biased above or below anchor 326. Or, indicator 330 may be represented by a flat, rectangular plate-like geometry as an alternative to the rod-like geometry shown, disposed to exit an extended mail-slot like opening in a wall of retainer 332 in order to increase obviousness of the indicator and/or further inhibit re-attachment of a child seat to the vehicle anchorage once the indicator has been deployed. The length of the indicator may be amended. FIGS. 24 through 27 illustrate non-limiting examples of alternative visual indicators.

FIG. 24 illustrates a portion of an alternative energy management device 360 having a retainer 362, a moveable load bearing member 364, a load bearing deformable member 366, a connecting member 368, an anchorage extraction indicator 370 and an anchor 372. The retainer 362 has a clearance hole, slot or aperture 374 for receiving one end 376 of the indicator 370. The indicator 370 is shown positioned within a pocket 378 that may be formed into the load bearing deformable member 366 and may be situated on center, or offset from the longitudinal axis of member 366 depicted in FIG. 24. The indicator 370 may sit within pocket 378 during static conditions, and extend through the clearance aperture 374 to be secured to the retainer 362 as the anchor is extracted.

With reference to FIG. 25, the anchor 372 of device 360 is shown in an extracted position, wherein end 376 of indicator 370 extends through the clearance aperture 374. It will be appreciated that the end 376 may be brightly colored, or even illuminated, so as to apprise an occupant that the restraint anchor has been deployed. A contact switch (not shown) could be disposed between the load bearing deformable member 366 and the end of the retainer 322. Upon contact, a light could be illuminated hence indicating deployment. By providing an indicator 370, the occupant may be informed that the device has functioned and certain predetermined end user notification criteria have been met. This may cause the occupant to replace, reset, or otherwise inspect the device for future use. The geometries of indicator 370 and corresponding pocket shown in deformable member 366 may be altered for the purpose of coordinating the activation of indicator 370, relative to a predetermined amount of anchor displacement.

Figure 26:
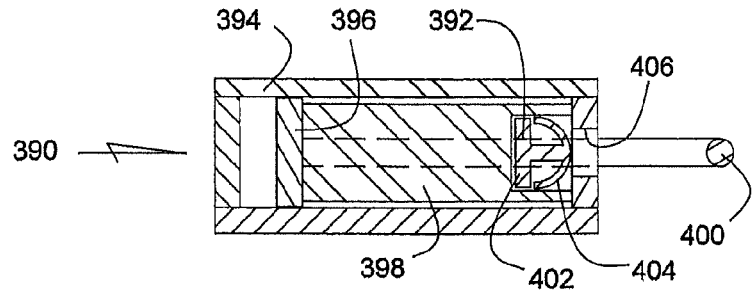
FIG. 26 illustrates a sectional view of an alternative energy management device utilizing an alternative anchor extraction indicator.

FIG. 26 illustrates a portion of an alternative energy management device 390 shown in its static condition with an alternative indicator 392. A retainer 394, a moveable member 396, a load bearing deformable member 398 and an anchor 400 are shown. The indicator 392 can be positioned within a portion of the load bearing deformable member 398, whether positioned centrally, or offset from the central longitudinal axis of the device depicted in FIG. 26. The indicator 392 has a base 402 and a curved portion 404. A hole, slot or aperture 406 in the end wall of retainer 394 is sufficiently large to allow the curved portion 404 of indicator 392 to pass through when the anchor is extracted. The curved portion 404 is spring-biased, and after passing through aperture 406, expands and flattens out to cover a greater surface area than that of aperture 406 for increased visibility. The indicator 392 may be made of plastic, rubber, metal or similar materials having sufficient flexibility to distort and pass through aperture 406, while exhibiting sufficient robustness and rigidity to remain engaged with the wall of retainer 394 when deployed.

Figure 27:
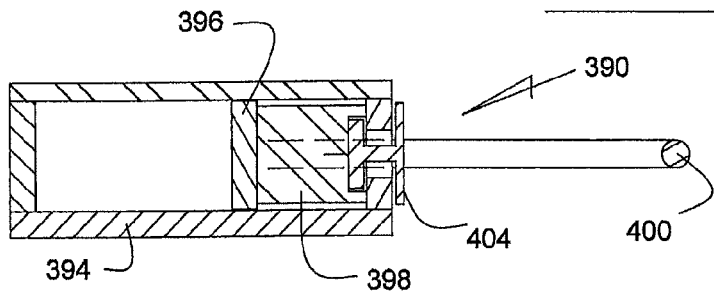
FIG. 27 is a sectional view of the FIG. 26 device, showing the indicator in the deployed position.

As seen in FIG. 27, the anchor 400 is shown in an extracted position. The curved portion 404 of the indicator is now flattened in an expanded state external to retainer 394, providing a visual aid for an occupant to see. The indicator 392 remains in contact with retainer 394 when anchor 400 is retracted.

Figure 28:
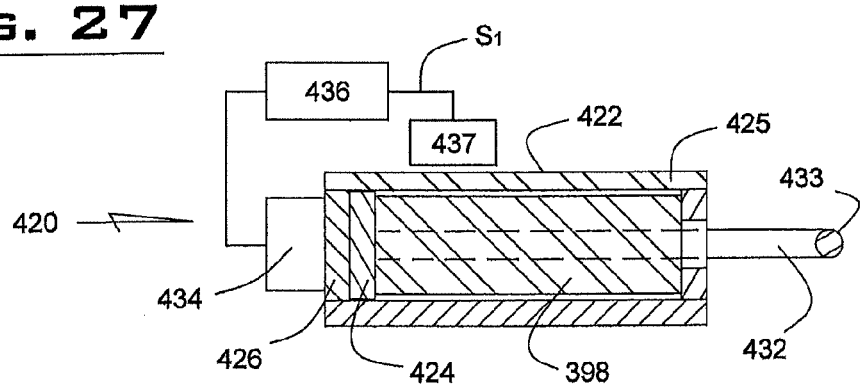
FIG. 28 illustrates a sectional view of an alternative energy management device utilizing moveable members that may be interlocked by electromagnetic actuation.

FIG. 28 illustrates a portion of an alternative energy management device 420 that includes a retainer having an end wall 426 and side walls 425, at least one load bearing moveable member 424, one or more load bearing deformable material members 398 and an anchor 433. Anchor biasing elements or return assist members described in reference to prior figures, may be further included in some implementations of device 420, but are not shown in FIGS. 28 and 29. The moveable member interfaces with anchor 433 via one or more connecting members 432 extending through the opposing end of the retainer 422.

A magnetic interlock may be incorporated to control movement of anchor 433. At least one wall or portion of a wall of retainer 422 may be electromagnetically charged or otherwise magnetized to attract ferrous materials. For example, end wall 426 of retainer 422 may be electromagnetically charged, and moveable member 424 made of ferrous material. A controller may work in concert with a sensor 437 to control the operation of device 420, wherein sensor 437 communicates signal $S_1$ to signal the operation, or affect the polarity, of the magnetically actuated interlocking member 434 proximate to end wall 426. Sensor 427 may be operable to detect an abrupt change in vehicle acceleration or an impact condition of sufficient magnitude to meet pre-determined dynamic device actuation, interlock release threshold criteria. Sensor 437 may send a signal $S_1$ to controller 436 in order to reverse the polarity of magnet 434 and permit moveable member 424 to separate from engagement with end wall 426 when said actuation criteria are met. Controller 436 may be used to set the polarity of magnet 434 such that moveable member 424 may separate from engagement with end wall 476 upon experiencing inertial loading of sufficient magnitude to overcome the magnetic force binding member 424 to wall 476, as an alternative to reversing the polarity of magnet 434 to release moveable member 424. Sensor 427 may not be required in this case. In either case, input load redistribution and corresponding anchor displacement occur when the moveable member is released from an interlocked position and permitted to distort deformable member 398, wherein the rate and magnitude of the load applied to anchor 433 exceeds predetermined threshold criteria to initiate distortion or displacement of member 398.

Controller 436 and sensor 437 may be used to alter polarity of magnet 434 during the retraction phase of device operation as well, such that moveable member 424 may return to its initial position, and again be magnetically interlocked. Sensor 437 may be operable to detect the position of moveable member 424 as the anchor 433 is extracted or retracted. Magnet 434 may be used to further assist in drawing moveable member 424 towards end wall 426 during the retraction phase. One or more side walls of retainer 422 may also be electromagnetically charged in lieu of, or in combination with, electromagnetic control of end wall 426. As such, moveable member 424 may be interlocked and retained in, or released from, one or more intermediate locations, thereby providing additional control over anchor movement as the anchor extracts or retracts. Changes made to the polarity or magnetic strength of the magnetically actuated interlocking member 434, as the anchor extracts, may enable further tuning of device 420's energy management and anchor displacement control capabilities. Device 420's functional capabilities are further controlled by the characteristics of deformable member and any anchor biasing elements.

Figure 29:
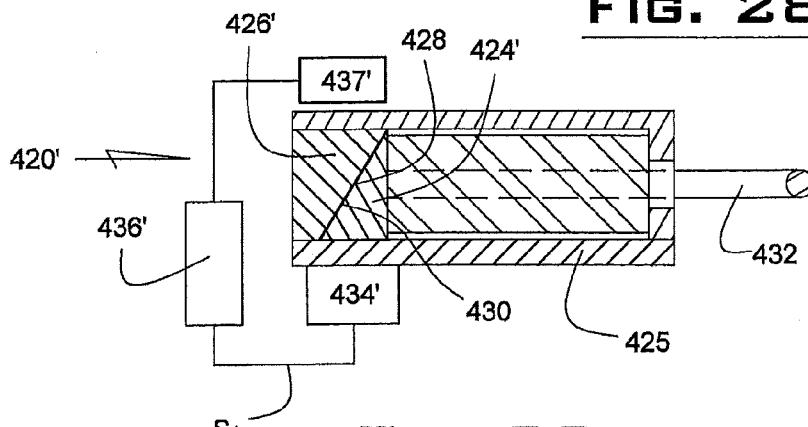
FIG. 29 illustrates a sectional view of an alternative energy management device having moveable members with alternative geometries.

As an alternative to sensor and controller based magnetic polarity modification, end wall 426 and/or some portion of at least on side wall 425 may be magnetized in the absence of controller 436, sensor 437 and/or magnet 434. In such a configuration, the moveable member 424 would simply mechanically disengage from an initial position of contact with, or position of proximity to, end wall 426 and/or side walls 425 upon experiencing inertial loading of sufficient magnitude to overcome the predetermined magnetic force between the moveable load bearing member 424 and one or more retainer walls. The movement of member 424 may then cause distortion of deformable material 398 if the load imposed on the restraint anchor 433 is sufficient to do so. The force of magnetism, magnetic contact surface area and geometry of moveable member 424 and retainer walls 425 and 426 may be configured to tune device 420 to cause moveable member 424 to be retained in an interlocked position in static condition, released from an interlocked position in a dynamic condition and re-engaged with end or side walls when the anchor is again retracted to an interlocked resting position. For example, the engagement surface contact area between moveable member 424 and end wall 426 may be oriented perpendicular to the direction of anchor displacement, providing a maximum magnetic engagement force between these components. The input load required to overcome the magnetic binding engagement force between moveable member 424 and end wall 426 may be tuned by altering the magnetism of either member, or by orienting the corresponding engagement surfaces at an offset angle, relative to the direction of anchorage extraction and retraction. This is illustrated in FIG. 29 where a slanted portion 428 of end wall 426' is shown mating with a corresponding slanted portion 430 of a moveable load bearing member 424'. Introducing magnetization of retainer side walls 425 may enable further tuning of device 420's load carrying and anchor interlocking capabilities, as well as the rate of speed or total amount of anchor displacement permitted during extraction or retraction phases.

FIG. 29 further illustrates an alternative embodiment having the above-mentioned angular surface contact relationship between end wall 426' and moveable member 424'. Slanted portion 430 of moveable member 424' interfaces with connecting member 432. The interlocking engagement and release of moveable member 424' may be operated by a controller 436' in communication with sensor 437' wherein a control signal $S_1$ causes magnetic actuator 434' to be electronically charged and discharged, thereby facilitating the interlocking retention or release of the movable member 424'.

Relative to FIGS. 28 and 29, a combination of the aforementioned electromagnetic and mechanically magnetized engagement surfaces may further enhance the flexibility of the device's functionality.

FIGS. 30 through 42A illustrate various embodiments of energy management devices incorporating tuned, dynamic anchor displacement and energy management control interlocks, wherein at least one blocking member or blocking surface is incorporated, operable to engage one or more moveable retention members in a first static, interlocked condition. Said blocking member or surface is further operable to be disengaged from contact with one or more retention members when the inertial force exerted on the device exceeds a predetermined threshold value, in a second dynamic condition. Said retention members are operable to control displacement of a load bearing member, wherein said load bearing member may be a deformable member, a moveable member, or both as applicable. Disengagement of said blocking member or blocking surface from said retention member, under dynamic loading conditions, correspondingly results in the disengagement and release of said retention member from an interlocked condition with said load bearing member. A restraint anchor, operatively associated with said load bearing member, is permitted to extract when said member is released from said interlocked position. However, said restraint anchor will only extract from a first static position when the rate of application, and the magnitude, of the input load applied to said anchor are further sufficient to initiate distortion/displacement of one or more deformable members operatively associated with said anchor under said dynamic loading conditions. The energy management capability of the device is thereby activated and the device absorbs a portion of the energy that would otherwise be transferred to the seated child through the interfacing connection with the child seat attachment feature. The aforementioned dynamic load condition is generally brought on by an abrupt vehicle deceleration or a vehicle impact condition.

The dynamic energy management function is not enabled if the inertial loads imposed on the restraint anchor device, or the rate of application and magnitude of input loads imposed on the restraint anchor, are below the activation thresholds required to disengage the inertial interlock or to initiate distortion of the deformable member. The anchor and corresponding moveable member are therefore prevented from displacing, and the energy management device behaves comparably to a traditional, fixed-position restraint anchor. An interlock of this nature facilitates compliance to the FMVSS 225 requirements referred to in the summary section. Independent first position anchor control interlocks, or retraction interlocks may also be included, as previously described. The geometries and function of dynamic control interlocking components may be adapted to re-engage when an anchor is retracted for device re-use. Additional interlocks operable to control the total amount of extraction permitted by, or the post extraction position of, an anchor are also discussed in reference to FIGS. 39-48. Sensors, controllers, actuators and indicators may further be incorporated in the devices or systems discussed in reference to FIGS. 30-48.

FIG. 30 illustrates an embodiment of an energy management restraint anchor device 440, incorporating a tuned, dynamic anchor displacement and energy management control interlock, wherein blocking mass members 448 are represented by moveable masses and retention members 452 are represented by swing levers interfacing corresponding biasing members 454 (such as springs). Device 440 further includes a retainer 442 with a central portion 444 containing components similar in nature to those described in reference to prior embodiments depicted or described herein. Device 440 is shown including blocking mass member retainers 446 and 450, and a connecting member 456 associated with deployment assembly 458. Deployment assembly 458 includes moveable load bearing member 460, interfacing at least one connecting member 456 interfacing anchor loop 462. One or more anchor biasing, or return assist members 464 may be incorporated, as applicable. A member 464 may bias the moveable member 460 to the position shown in FIG. 31. Member 464 may additionally serve to assist in returning the moveable member 460 and corresponding anchor loop 462 towards their initial positions upon rebound, or may supplement the recovery of a resilient deformable material as described in reference to prior Figures. One or more load bearing deformable members or energy absorption materials 466 are also incorporated. A child seat tether hook, clip, clasp or alternative releasable engagement clip or claw-like mechanism 468 is connected to the anchor loop 462.

FIG. 30A illustrates a cross sectional view of device 440 taken from the perspective 30A-30A of FIG. 30, wherein the blocking member 448 has a guide notch 470 located in its central portion, operable to receive and engage retention member 452 (shown in FIGS. 30, 31, 32). A guide 472 on blocking mass member retainer 446 is operable to receive a second notch 471 on blocking member 448 so that member 448 may slide axially.

Relative to FIGS. 31 and 32, at least one blocking mass member is operable to translate from a first position of engagement with retention members 452, relative to retainers 446 and 450, and to become disengaged from contact with retention members 452 in a second condition. Blocking member displacement may occur as a result of the inertial forces being exerted on the device 440, sufficient to overcome the sliding friction resistance and the transverse loads imposed on blocking member 448 by spring biased retention member 452. Blocking member 448 is shown engaged with the retention member 452 in FIG. 31, wherein a surface 474 on the retention member 452 engages surface 476 on the movable member 460, causing the movable member 460 to be held in place under static conditions. This interlocking arrangement secures and precludes displacement of movable member 460 under predetermined loading conditions. It will be appreciated that the blocking member 448, retention member 452 and biasing member 454 may be employed in only a single location on the device 440 as an alternative to the symmetrically disposed pair of blocking, retention and biasing members depicted in FIGS. 30-32.

Alternatively, the position of a blocking member 448 or retention member 452 may be electronically controlled. FIG. 31 further illustrates a modification to the system 440 that could employ a sensor S, a controller C, and an actuator. In this embodiment, the actuator is represented by a magnet M in association with the blocking member retainer 442 (also applicable to retainer 446). The sensor S may operate to sense an abrupt change in acceleration or a vehicle impact condition and generate a signal $S_1$. Signal $S_1$ is transmitted to a control device C to trigger the function of an actuator, such as a magnet, electromagnet or some other device M imparting a charge, or otherwise capable of either affecting the position of the intermediate blocking member 448, or directly affecting the position of retention member 452, wherein blocking member 448 is absent from said device. For example, an electromagnetic charge applied to the wall of retainer 446 may be operable to propel blocking member 448 out of engagement with retention member 452 in order to release the moveable load bearing member 460 from an interlocked position. If member 448 is omitted from device 440, actuator M may instead directly propel retention member 452 to engage moveable load bearing member 460 in a first condition. A signaled change in magnetism or polarity of a magnetic actuator may permit the biasing spring force of member 454 to disengage member 452 from member 460. In all cases, retention member 452 is ultimately permitted to rotate free from a position of engagement with moveable member 460 (as shown in FIG. 32), thereby enabling displacement of movable member 460, permitting anchorage displacement and corresponding deformation of energy absorption material 466. In order to return retention member 452 to a position of engagement with moveable member 460 (shown in FIG. 31), during the retraction phase of operation, the polarity of magnet M, for example, may be reversed, thus propelling the retention member 452 to an interlocked position, allowing it to secure the movable member 452 in place. Further, sensor S may be utilized to detect the position of moveable member 460 in order to facilitate timely engagement of retention member 452 with moveable member 460 during rebound or to signal an indicator. A device 440 which does not incorporate a sensor, controller and actuator operable to enhance an anchor retraction interlocking capability, may further incorporate retraction interlocking mechanisms of the sort previously described in reference to earlier figures in addition to the inertial interlock described herein.

It should be noted that energy management anchorage devices of the nature described in FIGS. 30-32 might also incorporate one or more magnets as an alternative to blocking and retention members depicted, as opposed to incorporating magnetism to control the blocking and retention members. The magnets may be tuned in size strength and orientation to facilitate inertial disengagement. The magnitude and direction of the applied magnetic engagement force may be varied relative to a predetermined rate and magnitude of inertial force that must be overcome to disengage a retained member. For example, the device may be adapted to incorporate a simple ball and tube representing blocking member 448 and retainer portion 446, wherein either the ball or an end of the tube like retainer portion are magnetized. Retention member 452 would have a compatible geometry to sufficiently engage ball shaped blocking member 448. The tube-like portion representing retainer portion 446 would have an opening for retention member 452 to pass through and engage ball shaped blocking member 448. A sufficient inertial force imposed on device 440 would overcome the magnetic and frictional contact forces between said ball, said retainer portion and said retention member to permit the ball to become disassociated with the retention member and permit release of moveable member 460 and corresponding anchor displacement, as applicable.

Magnets may be positioned to disengage a retained member when loading is applied perpendicular to the magnetic surface or such that a component of the disengagement loading is in shear.

FIG. 32 illustrates the anchor of device or system 440 in a deployed condition, wherein the dynamic, inertial forces exerted on the device have met predetermined dynamic device actuation, interlock release threshold criteria and blocking members 448 have translated in the direction of the arrow shown, overcoming frictional surface contact forces and the transverse loading applied by retention members 452 engaged with biasing members 454. Members 448 are therefore shown disengaged from contact with retention member 452. The biasing members 454 have assisted in rotating retention members 452 to fully disengage from interlocking contact with the moveable load bearing member 460. The load bearing deformable member 466 is then permitted to be displaced/distorted by moveable member 460, if the rate and magnitude of input loads applied to the interfacing restraint anchor are sufficient to initiate said displacement/distortion while the interlock is disengaged. Dynamic restraint energy is absorbed as the moveable member, interfacing said restraint anchor connected to a child seat, is displaced to distort deformable member 460 in conjunction with the movement of the child seat within the vehicle. Under quasi-static loading conditions such as those defined in FMVSS 225, blocking member 448 remains stationary and retention member 452 remains engaged with moveable member 460 to preclude displacement of anchor 462 and corresponding deformation of energy absorption material 466 intended only to occur under dynamic loading conditions. As has been described in reference to the various aforementioned embodiments, the geometries, orientations and quantities of the components comprising energy management anchorage device or system 440 may be varied to achieve the functional and packaging needs for a given application, while offering the same performance capabilities already having been described. For example, a block-shaped blocking mass that translates relative to a retainer wall could be replaced with a ball in tube, wherein said is magnetically retained to an end of said tube, said ball translates or rotates, disengaging the magnetic retention force under inertial conditions. Displacement of said ball may directly permit release of a retention member, triggers an electronically controlled actuator, electromagnet or the like, for the purposes of controlling anchor displacement, distortion of energy management material and energy redistribution.

Figure 33:
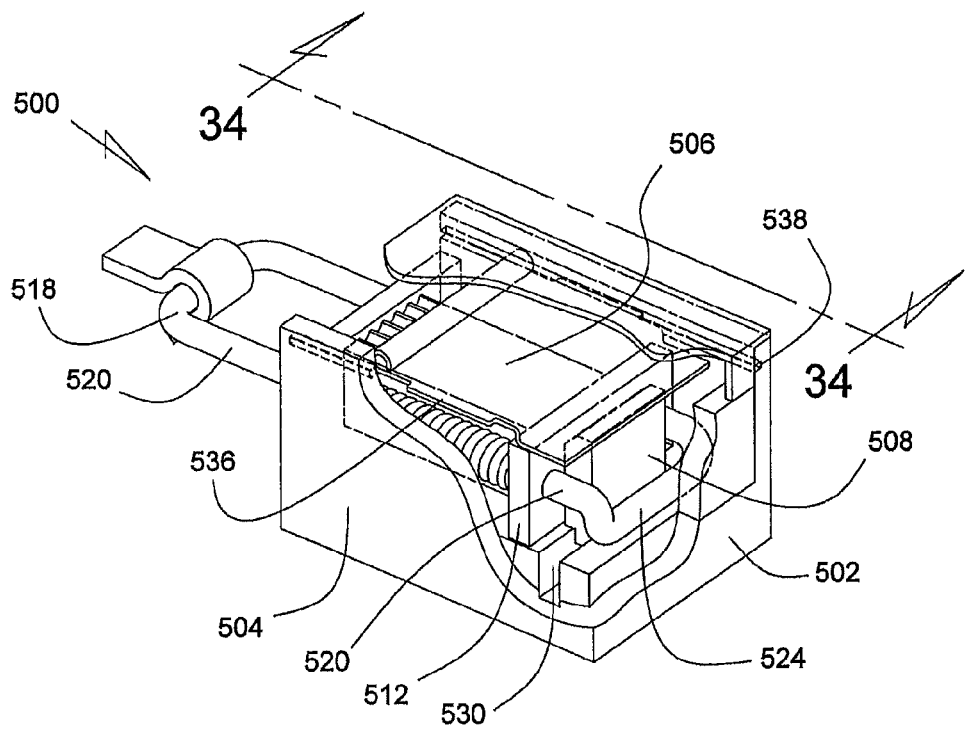
FIG. 33 illustrates an alternative energy management device utilizing a dynamic anchor displacement and energy management control interlock to facilitate dynamic energy management, represented by a slide plate inertial control system.
Figure 34:
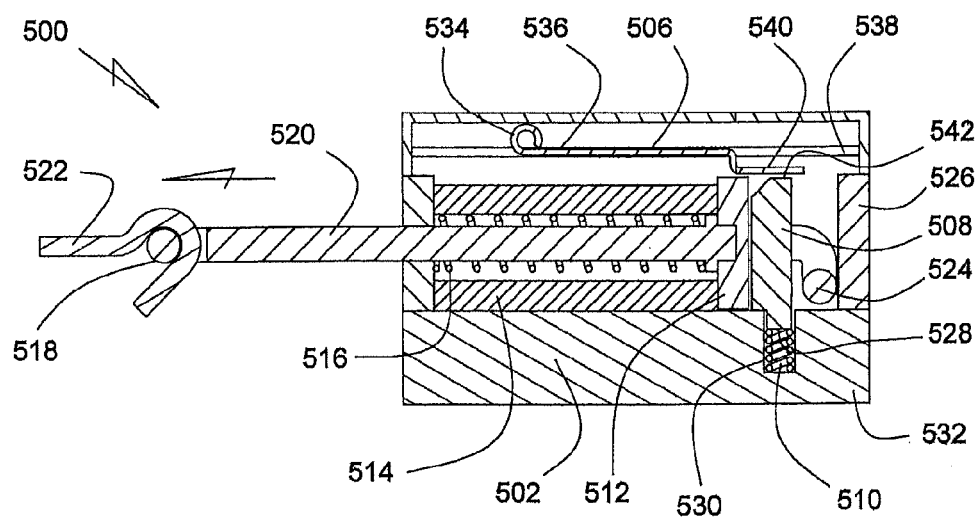
FIG. 34 illustrates a sectional view taken from the perspective of line 34-34 of FIG. 33 shown in a static un-deployed state.

FIGS. 33 and 34 illustrate an alternate embodiment of an energy management device or system 500 that employs a tuned, dynamic anchor displacement and energy management control interlock, wherein a blocking mass member 506 is represented by a slide plate and a retention member 508 is represented by a displaceable plate-like locking wedge that engages a spring 510 for biasing the retention member. Device 500 further includes a retainer 502, side walls 504, a moveable load bearing member 512, at least one load bearing deformable member 514, an anchor 518, at least one connecting member 520, and may include one or more return assist members 516. A down turned portion 524 at an end of the connecting member 520 initially rests between a wall 526 of retainer 502 and retention member 508. Down-turned portion 524 and the portion of member 520 extending from moveable member 512 towards retainer wall 502 may instead be represented by a similar protruding geometry that is integral to member 512, or an aperture in member 512, capable of being engaged and retained by retention member 508. The anchor 518 is shown as looped-shaped. The retention member 508 has a lower portion 528 that is operable to engage the spring-like member 510 in a recessed area 530 of the base 532 of the retainer 502. The blocking member 506 includes a weighted portion 534 and blocking member contact surface 536 that engages guide surface 538 within the retainer 502. This allows the blocking member 506 to translate within the retainer 502. The blocking member 506 includes a retention member contact surface portion 540 (depicted as an offset surface in this embodiment) that engages the upper surface 542 of the retention member 508.

FIG. 34 depicts the retention member 508 secured in position, bound by contact surface 540 of blocking member 506, and wherein the lower portion 528 is contained within the recessed area 530 of the retainer 502. While the anchor 518 is depicted as incorporating, or being attached to, a pair of elongated connecting member portions 520 that extend through the moveable member 512, any combination of distinctly separate or wholly integral components may be achievable. Such combinations may include alternative geometries that incorporate the features of anchor 518, connecting member(s) 520, moveable member 512 and down turned portion 524 in a single manufactured component, as an alternative to attaching a plurality of independent components while achieving the same functional result. Blocking member 506 may incorporate extended tabs representing contact surface 536 that are received within a slot, groove or notch shaped guide surface 538 of the retainer 502 as shown in FIGS. 33 and 34.

Alternatively, the geometry of the blocking member contact surfaces and retainer guide surfaces may be varied and still provide the same function. For example, the grooved guide surface 538 may instead be represented by a plurality of v-shaped detents (not shown) extending inward from multiple interior wall surfaces of retainer 502. Such detents would be operable to provide surface contact points that engage and provide a guide path for the planar surface of blocking member 508 to move within, replacing the extended tab-like contact surfaces 536 and groove 538 shown in FIGS. 32 and 33. Also, in alternative embodiments, the blocking member 506 may be configured to provide the same function by directly engaging a retention member 508 without incorporating an offset portion.

Blocking member 506 is operable to translate in the direction of the arrow shown when the dynamic, inertial forces exerted on the device 500 are sufficient to have met predetermined dynamic device actuation, interlock release threshold criteria. Under these conditions, retention member contact portion 540 correspondingly translates and disengages the upper portion 542 of the retention member 508, overcoming any frictional forces between contact surfaces 540 and 542, 536 and 538, between the lower portion of retention member 508 and the pocketed wall surfaces of recessed area 530, and any transverse loading forces applied between contact surface 540 and 542 as a result of spring member 510 biasing retention member 508 against blocking member 506. An offset mass, or weighted portion 534 of blocking member 506 is further shown, operable to facilitate the translation of the blocking member 506 relative to guide surface 538 when the device is inertially loaded. Spring biasing member 510 propels retention member 508 from engagement with recess 530 when member 508 is disengaged from blocking member 506, permitting the displacement of down-turned portion 524 of connecting member 520, operatively associated with load bearing moveable member 512, thereby enabling the corresponding extraction of interfacing anchor 518. Moveable member 512, interfacing the connecting member 520, is only permitted to distort load bearing deformable member 514 for the purpose of absorbing restraint energy if the rate of application and the magnitude of the load applied to the interfacing anchor 518, connected to child tether hook, clip, clasp or claw-like engagement mechanism 522, exceeds predetermined threshold criteria to initiate distortion or displacement of deformable member 514. The amount of anchor extraction corresponds to the amount of distortion and/or displacement of deformable member. It should be noted that the retainer 502 and device 500's components, geometries, quantities, and configurations may be alternatively represented by components or configurations similar in nature to those described in prior embodiments disclosed herein.

Figure 35:
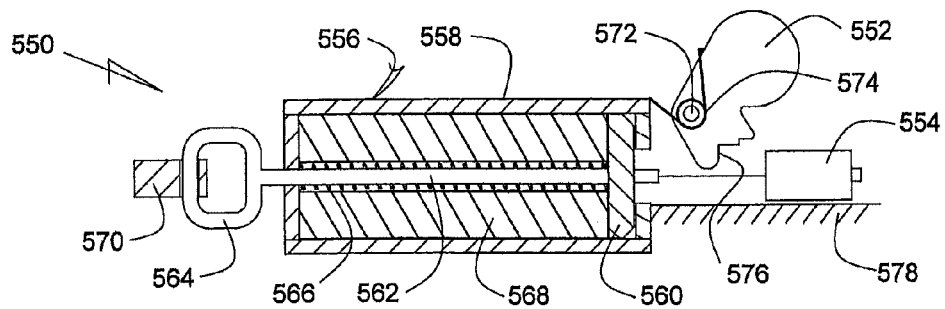
FIG. 35 illustrates a sectional view of an alternative energy management device incorporating a dynamic anchor displacement and energy management control interlock represented by a rotating mass that releases a slide block enabling anchorage extraction and subsequent energy management through displacement of the deformable member.

FIG. 35 illustrates an alternate embodiment of an energy management system 550 that employs a tuned, dynamic anchor displacement and energy management control interlock, wherein at least one blocking mass member 552 is represented by a rotating offset mass member and at least one corresponding retention member 554 is represented by a sliding block mass. Device 550 further includes a deployment assembly 556. The deployment assembly 556 includes a retainer 558, a moveable member 560 that interfaces with one or more connecting members 562 that interface directly with anchor loop 564. One or more return assist members 566 may be incorporated as applicable, to bias the moveable member 560 to the position shown in FIG. 35. Member 566 may additionally serve to assist in returning the moveable member 560 and corresponding anchor loop 564 towards their initial positions upon rebound, or to supplement the recovery of a resilient deformable material as described in reference to prior Figures. One or more load bearing deformable members or energy absorption materials 568 are also incorporated. A child seat tether hook, clip, clasp or alternative releasable engagement clip or claw-like mechanism 570 is connected to the anchor loop 564.

FIG. 35 illustrates the device in a dynamically inactive state—as would be represented during typical driving conditions wherein the retention member 554 is disengaged and disposed a small distance from the blocking member 552. The blocking member 552 has a pivot point 572, a spring 574, for biasing the blocking member 552, and an engagement surface 576 that is operable to engage the retention member 554. Engagement surface 576 is depicted as a notch or depression in the blocking member 552 for purposes of this illustration. The retention member 554 may contact surface 576. Contact surface 578 may be represented by a local retainer encapsulating retention member 554 and/or blocking member 552 and spring 574, or may be configured to encapsulate the device 556, blocking member 552, and retention member 554 and spring 574 so that they are mounted collectively.

Figure 36:
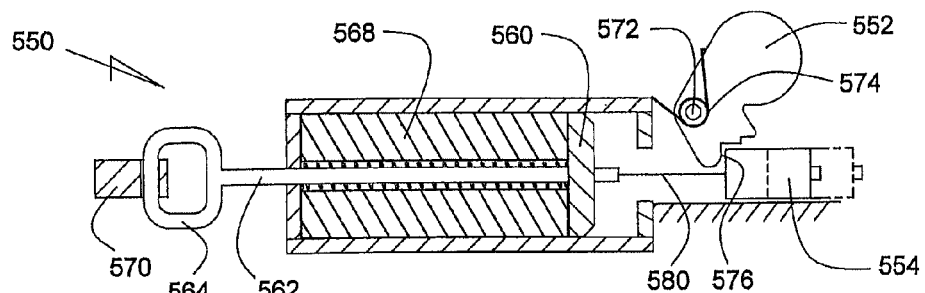
FIG. 36 illustrates the FIG. 35 device in a static test environment condition in which the slide block is engaged with the rotating mass, precluding the extraction of the anchor.
Figure 37:
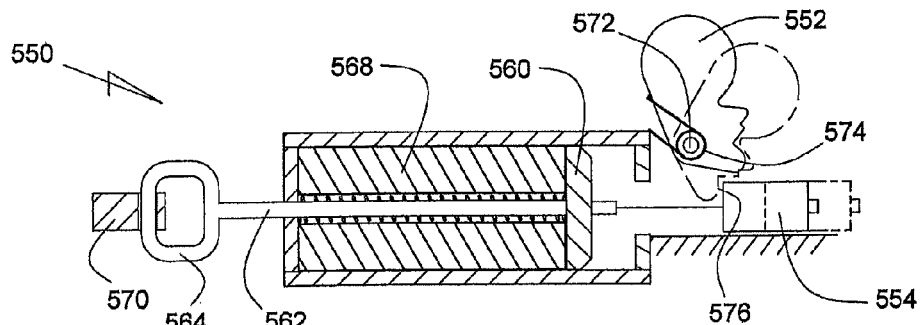
FIG. 37 illustrates the FIG. 35 device wherein the rotating mass has been displaced to permit the movement of the slide block, extraction of the anchor, and distortion of the deformable member.

FIG. 36 illustrates a static test environment condition wherein a load is applied to the anchor 564 in a non-dynamic, quasi-static manner. In this operating condition, anchor 564 is incapable of substantial extraction. Distortion of load bearing deformable member 568 is inhibited as the mobility of moveable member 560 is restricted. Connecting member 580 is attached, or integral to, either or both the moveable member 560 and retention member 554. Anchor 564 interfaces with connecting member 562, moveable member 560, connecting member 580 and retention member 554. The negligible initial extraction of anchor 564 is substantially limited, being essentially immediately halted when the motion of the retention member 554 is abruptly terminated as a result of engagement between retention member 554 and contact surface 576 of blocking member 552. The slow rate of quasi-static loading applied to anchor 564 is insufficient to cause the inertial rotation of blocking member 552 that would be necessary to overcome the biasing spring force of spring 574 to allow retention member 554 to pass by blocking member 552 and permit extraction of anchor 564, and corresponding distortion of load bearing deformable member 568. The dynamic device control interlock therefore remains engaged. The amount of anchorage extraction permitted prior to the engagement of retention member 554 with contact surface 576 is exaggerated in FIG. 36 for illustration purposes. The relative geometric proportions of blocking member 552, retention member 554 and retainer 558 are also exaggerated for illustration purposes. By preventing displacement of the anchor to satisfy static testing requirements, the anchor 564 of device 550 is adapted to perform similarly to that of a simple conventional fixed position anchor, as is currently known in the art, for purposes of compliance to aforementioned static testing requirements. The initial real world anchorage extraction for a device of this nature, operating in a static test environment, would be negligible compared to the displacement and/or deformation measured for the resultant fixed anchor equivalent device over the balance of a static test.

Offset mass blocking member 552 is operable to rotate counter-clockwise about pivot point 572, (from the perspective shown in FIG. 37) overcoming the biasing force of spring 574 when the dynamic, inertial forces exerted on the device 550 are sufficient to have met predetermined dynamic device actuation, interlock release threshold criteria. Under these conditions, the rotational displacement of the blocking member 552 allows retention member 554 to bypass blocking member 552 without obstruction, permitting displacement of the interfacing moveable load bearing member 560, thereby enabling the corresponding extraction of interfacing anchor 564. Moveable member 560, interfacing the connecting member 562, is only permitted to distort load bearing deformable member 568 for the purpose of absorbing restraint energy if the rate of application and the magnitude of the load applied to the interfacing anchor 564, connected to child seat tether hook, clip, clasp or claw-like engagement mechanism 570, exceeds predetermined threshold criteria to initiate displacement or distortion of deformable member 568. The amount of anchor extraction corresponds to the amount of distortion and/or displacement of deformable member.

Figure 38:
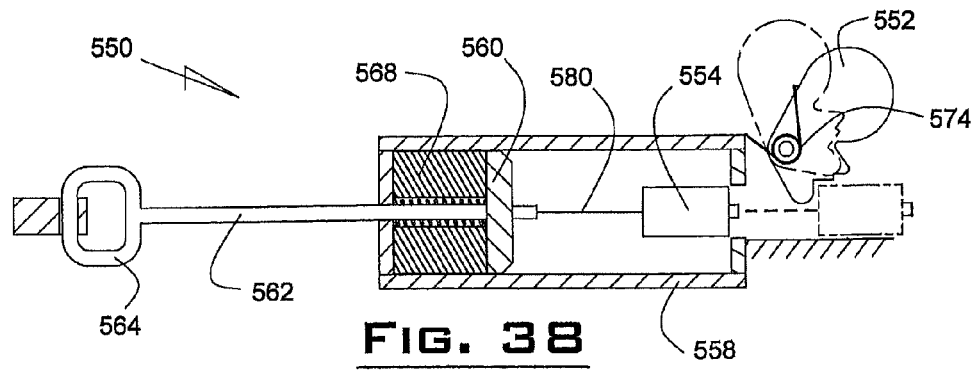
FIG. 38 illustrates the FIG. 35 device, wherein the anchor is extracted and the deformable member displaced.

FIG. 38 illustrates the anchor 564, and interfacing retention member 554, having been substantially extracted. Deformable material 568 has also been distorted by the moveable load bearing member 560 to absorb energy as the anchor is extracted. Connecting members 562 and 580 may each be represented by a rigid, semi-rigid or flexible member such as a rod, cable or alternative load carrying member. Connecting members 562 and 580, anchor 564, moveable member 560 and retention member 554 may be represented by independent components secured to one another through conventional means such as straps, welds, fasteners, etc. or any combination of these components may be consolidated and/or formed in combination with one another to reduce independent part count or increase the efficiency of device operation. It should be further noted that the retainer 558 and device 550's component geometries, quantities, and configurations may be alternatively represented by functional components or configurations similar in nature to those described in other embodiments disclosed herein.

Figure 39:
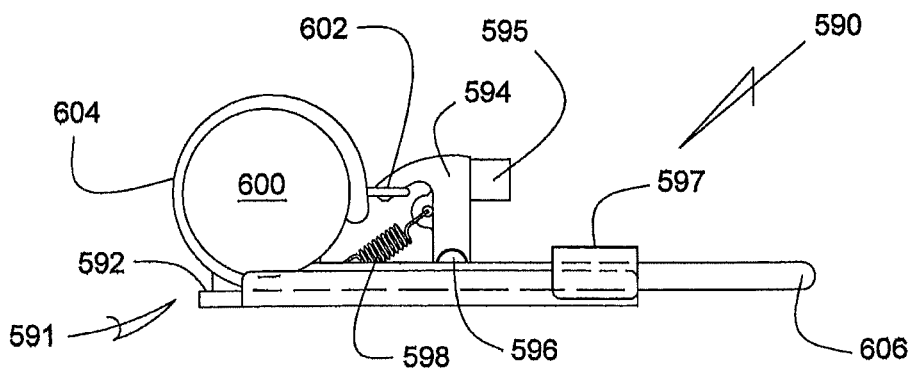
FIG. 39 illustrates a side view of another alternative energy management device incorporating a dynamic anchor displacement and energy management control interlock, and a loop-shaped deformation member.

FIG. 39 illustrates an energy management anchorage device 590 that employs one or more load bearing deformable material members that may distort, elongate and translate by uncoiling relative to a generally cylindrically shaped load bearing portion of a retainer, in order to absorb energy as the anchor is extracted. The device 590 includes a retainer 591 having at least one wall 592 and a load bearing member 600, securable to wall 592 and relative to which one or more load bearing deformable material members 604 and an associated anchor portion 606 of device 590 may be displaced. A guide 597 is shown. Guide 597 may be operable to facilitate maintenance of an initial position of deformable member 604 and anchor 606 or provide a guide path for anchor extraction. Guide 597 may be attached to retainer 591 or integral to a retainer wall, as shown. Retainer load bearing member 600 is generally non-deformable and may maintain a fixed or moveable position relative to retainer wall 592. FIG. 39 depicts an embodiment in which the position of member 600 is fixed. Member 600 may also be configured to be moveable. The load bearing member 600 is shown having a spool, hub or mandrel shaped geometry, and wall 592 is represented by a base wall portion, in FIG. 39. At least one deformable member 604 is wrapped around the load bearing retainer member 600. Load bearing deformable member 604 is represented by an elongated loop-shaped energy absorption material. Member 604 is operable to absorb energy when distorted in conjunction with displacement of anchor portion 606. Member 604 is comprised of a material suitable to provide sufficient consistency in displacement or deformation so as to manage the predetermined static and dynamic load conditions. Member 604 may be derived from an alloy, composite or other material, as appropriate to achieve the desired functionality. Anchor portion 606 is operable to receive a child seat tether hook, clip, clasp, claw-like mechanism (not shown). FIGS. 39-42a depict devices 590, 620 and 626 having an anchor portion 606 interfacing a load bearing deformable material member 604, wherein the deformable member includes an anchor end portion 606 that is integral to deformable member 604. Anchor end 606 may be alternatively represented by a separate anchor 606 affixed directly to load bearing deformable material member 604. Anchor 606 may also be secured to, or integrally interface intermediate connecting members that directly engage deformable member 604, as described in reference to earlier figures. The aforementioned connecting members are integrally represented in FIGS. 39-42a by the linear portion of the deformable member that is disposed between anchor end 606 and the approximate point of departure from engagement with load bearing member 600.

Device 590 may further include an interlocking retention member 594, having an offset, biased mass portion 595. Member 594 is pivotally connected 596 to retainer wall 592. Device 590 may also include a spring-like member 598 for biasing the retention member 594, and a blocking member interlocking engagement surface 602 disposed relative to load bearing member 600 for engaging retention member 594. Retention member 594 is depicted as an articulating lever for this embodiment. Blocking member engagement surface 602 may alternatively be represented by a ledge, standoff, protrusion, pocket, aperture or similar engagement surface located directly on an external wall surface of the load bearing member 600 portion of retainer 591. One or more surfaces 602, pivots 596 and members 594 may alternatively be mounted adjacent an external side wall of load bearing member 600 of retainer 591. While not shown, retention member 594 may be represented by a sliding mass 594 as an alternative to a pivotal retention member 594, still operable to engage a blocking member engagement surface 602, wherein said mass 594 would be disposed relative said wall 592 and wherein wall 592 would incorporate a raised sliding surface to accommodate sliding mass 594, proximate to engagement surface 602.

Figure 40:
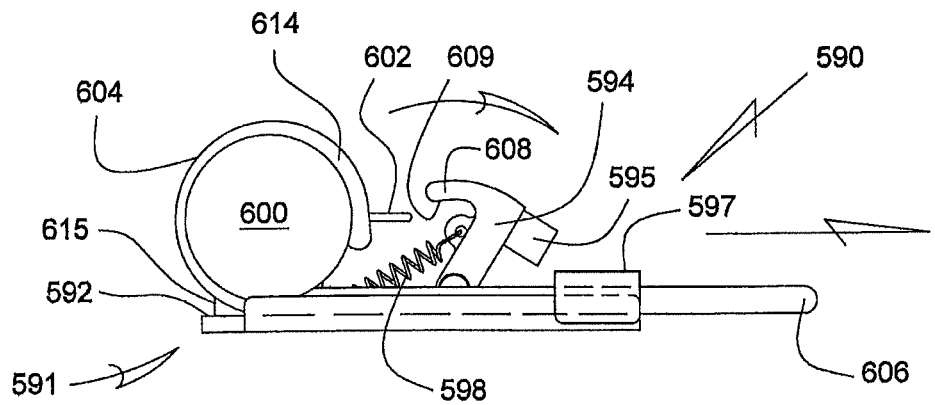
FIG. 40 illustrates the FIG. 39 device wherein an articulating retention member lever has pivoted forward and the anchor has been released and distortion of deformable member has occurred.
Figure 41:
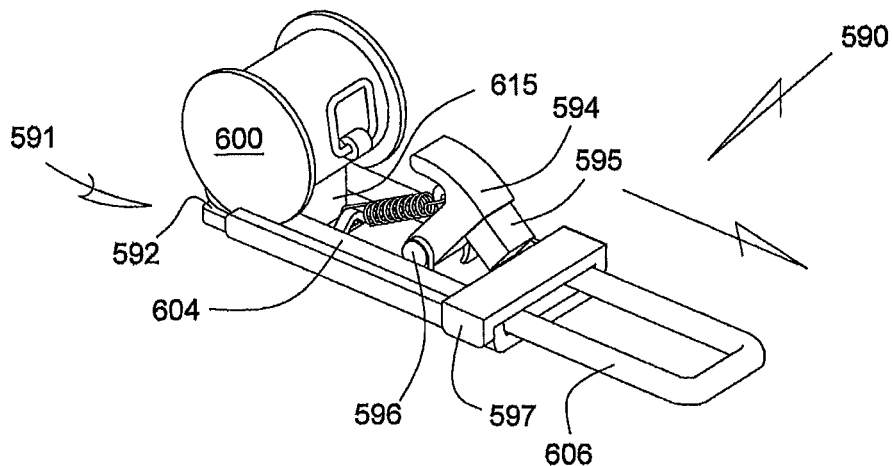
FIG. 41 illustrates the FIG. 39 device with the deformable member partially deployed.

FIGS. 40 and 41 illustrate the dynamic conditions in which the device 590 operates. Upon device 590 experiencing an imparted load of sufficient magnitude and rate of application to cause retention member 594 to rotate about pivot 596, the spring biased retention member force 598 and the frictional forces present between blocking member engagement surface 602 and retention member engagement surface 609 are overcome. Retention member engagement surface 609 is disposed on an engagement member portion 608 of retention member 594. For illustration purposes, portion 608 is depicted having a hook shaped or claw-like geometry. The relative geometry and position of the biased, offset mass portion 595 of retention member 594 are adapted to facilitate the rotation of the retention member about pivot 596 when the aforementioned abrupt inertial loads are imparted on device 590 or anchor 606. Retention member engagement surface 609 is then disengaged from blocking member engagement surface 602, enabling load bearing deformable member 604 to distort, elongate and be displaced by rotating about non-deformable load bearing member 600, generally straightening member 604 as the anchor end 606 is extracted, if sufficient input loads are imparted on anchor 606 to initiate said distortion and displacement. The rotation of deformable material 604 and displacement of end 614, relative to a fixed position member 600, is terminated as contact is made between end 614 and an interlocking stop 615. Stop 615 may be disposed on non-deformable load bearing member 600, on wall 592 of retainer 591, or may extend between member 600 and wall 592. Stop 615 may be represented by a stud, block, beam or similar component affixed to either member 600 or wall 592. The interlocking stop 615 may further function to directly secure member 600 to wall 592, thereby considered a component of retainer 591 joining load bearing member 600 with retainer wall 592 in assembly. Stop 615 may also be represented by a geometry integral to either or both of member 600 and wall 592, such as an extruded catch portion, stand-off, exterior ledge or similar feature operable to engage, interlock with, and control the movement of load bearing deformable material 604 and the corresponding displacement of anchor end 606. End 614 of load bearing deformable member 604 incorporates a geometry suitable to interlock with, or be restrained by, stop 615 in order to discontinue anchor displacement. Retainer 591 is secured to a structural component of the vehicle interior. A member 604 may distort and become displaced by unwinding relative to a member 600 having a fixed position (as shown), or in conjunction with the rotation of a moveable member 600 having a pivotal axis (not shown), wherein member 604 is fixedly secured to member 600 at end 614. In such a configuration, the rotation of deformable material 604 and displacement of end 614 may be terminated as contact is made between an interlocking stop 615 and a blocking engagement surface disposed on end 614 or elsewhere along the length of member 604, or on an exterior surface of moveable load bearing member 600 to which deformable member 604 is attached. In some instances, said blocking surface may be represented by the same surface 602 initially engaged with retention member 594. The interlocking stop component relationship may be employed in devices 590, 620 and 626 in combination with a dynamic release interlock. An interlocking stop relationship may be incorporated in said devices wherein the components of a dynamic release interlock represented by retention member 594, pivot 596, blocking member engagement surface 602 are not included a particular implementation.

The device 590 is preferably constructed from any combination components made of metal, composite or having alternative material compositions exhibiting sufficient functional properties capable of carrying load and permitting adequate tension, extension or related deformation. Further, one or more load bearing deformable members having various energy management or geometric properties may be incorporated into device 590, to work in concert with one another and operable to be deformed relative to said load bearing member 600 in order to achieve any of a plurality of functional load redistribution and anchorage displacement performance capabilities. Load bearing deformable members 604 may be adapted to be represented by other than a continuous loop (such as a discontinuous member), by a cross section that is other than rod-like, or otherwise varied in geometry while still performing the same intended function. Additionally, the load bearing deformable members may be configured to include resilient memory capability in order to enable partial or complete recovery of initial geometry and load carrying capabilities after having been extracted. Load bearing deformable members may be configured to provide non-recoverable energy management functionality/expendable one-time use or limited reusability, in which case interlocking features (not shown) would be incorporated to fix the position of the anchor upon retraction. Further, as mentioned in reference to various prior embodiments, return assist features (not shown) may be incorporated in order to bias the load bearing deformable member 604 to the position shown in FIG. 39 and may additionally serve to assist in returning the moveable deformable member 604 and corresponding anchor 606 toward their initial positions upon rebound, or to supplement the recovery of a resilient deformable material as previously described in reference to prior Figures.

In the case of the embodiment depicted in FIGS. 39-41, the return assist member may take the form of a coil spring (not shown) disposed within, or in close proximity to the load bearing member or hub 600. An offset, or centrally disposed, rotation axis may be introduced in the axial direction of member 600 to facilitate functionality of this nature. The recoiling of member 600 may be adapted to facilitate retraction of anchor 606 and deformable member 604. The relative sizes and geometries of the hook shaped portion of retention member 594, engagement surface 608 and offset mass portion 595 may be altered to achieve the desired performance. The geometries shown in FIGS. 39-41 are provided for illustration purposes only. For example, the geometry and position of biased, offset mass portion 595 of retention member 594 may be altered in tune the device to operate under a variety of inertial activation load conditions. Device 590 may also be adapted to permit load bearing deformable member 604 to elongate or to be displaced by fixedly rotating in connection with a non-deformable moveable load bearing member 600 (rather than relative to a fixed position load bearing member) having a centrally disposed, or an off-axis pin or axle passing through the member 600 in a generally axial direction that is generally transverse to the direction of anchorage extraction. Device 590 may be further adapted to incorporate an indicator, a sensor, controller, mechanical magnet or electromagnetic for the purposes of occupant detection, or increasing the flexibility of device function, as described in reference to prior figures included herein.

FIG. 42 illustrates an alternative energy management device 620 that employs many features similar to those discussed in reference to the FIGS. 39-41 embodiment above, and operates in the same manner. Therefore, common references will be employed where possible. Device 620 includes a retainer 591, having at least one wall 592 and a generally non-deformable, fixed-position load bearing member 600 securable to said wall 592 and relative to which one or more elongated load bearing deformable material members 604, and an anchor 606 may be displaced. A guide 597 and a retention member 594 are also shown. Retention member engagement surface 609, located on the engagement member portion 608 of retention member 594, engages directly with surface 622 disposed on end 614 of load bearing deformable member 604. This simplified direct engagement relationship represents the fundamental difference between device or system 590 and 620. As device 620 functions dynamically, the retention member 594 rotates towards anchor end 606, thus releasing the retention member engagement surface 609 from blocking engagement with surface 622 at end 614 of load bearing deformable member 604. The load bearing deformable member 604 is then free to be extracted according to the methodologies discussed in reference to the FIG. 39-41 embodiments. The balance of functional device component relationships, functional capabilities and various adaptations described in reference to device 590 are also applicable to device 620.

With reference to FIG. 42a, an alternative energy management device 626 is illustrated, being similar in structure to that disclosed in the FIGS. 39-42 embodiments. Common figure item number references will be employed. As an alternative to incorporating one or more fixed geometry load bearing deformable members, load bearing deformable material member 604 is shown having an altered geometry over portion 628, wrapped around the generally non-deformable hub, spool or mandrel shaped load bearing member 600. Member 600 is shown having fixed position, but may be adapted for rotation as previously discussed. By providing for variable cross sectional geometry of the load bearing deformable material 604, the performance characteristics of the deformable member can be adapted to substantially alter the performance of device 626. The cross section may be represented by other than constant round, square or rectangular shapes. The cross sectional area of the deformable member 604 may be modified by altering the length L, width W or height H of member 604, The direction of material geometry alteration is defined by the arrows shown in FIG. 42a. In the present illustration, the cross sectional thickness of the deformable material has been increased in the W and H directions within portion 628, transitioning to a round bar geometry along its length L as it wraps around the generally non-deformable load bearing member 600. The transition may be gradual or the cross sectional geometry may change abruptly. It will be appreciated that various geometric configurations of the deformable material 604 are contemplated. One or more variable geometry load bearing deformable members may be adapted for use in device 626.

Incorporating a plurality of cross sectional areas in load bearing deformable member 604, along its length L, enhances the functional flexibility of the energy management restraint anchor device. The geometry of the cross sectional area of deformable member 604 may transition abruptly, or gradually, from one geometric shape to another to achieve certain load carrying and displacement performance characteristics. For example, a cross section may be continuously variable over a predetermined length of a portion 628, where the cross sectional area may increase or decrease steadily, or intermittently. A series of discrete, differentiable geometries, having constant or variable cross sectional areas may be employed in a stepwise fashion along length L. A wide variety of energy management characterization profiles may therefore be derived for a given anchorage device, or combination of anchor or devices, including progressive, digressive, multilevel and variable rise rate load limiting that may be achieved over a variety of predetermined anchorage displacement values, thereby enabling customized load carrying and load redistribution characteristics for various occupant sizes or occupant loading conditions. The balance of functional device component relationships, functional capabilities and various adaptations described in reference to devices 590 and 620 are also applicable to device 626.

FIG. 43 illustrates a perspective view of an alternative energy management device 630 which includes a retainer 631 having at least one wall 632, and a generally non-deformable, moveable load bearing member 634 that is securable to upwardly extending side walls or arms 642 extending from a retainer base wall 632 of retainer 631. Also shown are a retention member 636, a spring 638 for biasing the retention member, a deformable member 640 represented by a spring, for biasing the moveable load bearing member 634, a connecting member 644 and associated anchor 646. Blocking members 633, blocking member engagement surfaces 635, a retention member engagement surface 637 and biased offset mass 639 disposed on retention member 636 are further depicted. The retention member 636 is pivotally connected to retainer base wall 632 at a pivot 648. Connecting member 644 is operable to wrap around a perimeter of the hub 634 and to be recoiled thereon. One or more blocking and retention member relationships may be employed as shown. Said relationships may instead be disposed adjacent to a side wall of member 634, as discussed in reference to Device 590. One or more connecting members 644 may be employed, whether integrally or separately engaging anchor 646. A guide 645 and guide sleeve 647 are shown. Guide sleeve 647 may be operable to facilitate maintenance of an initial position of anchor 646 or to provide a guide path for one or more connecting members to transition through, and a cavity for a retracted anchor to rest within. Guide 645 is further operable to provide a guide path for one or more connecting members to travel within when the anchor is extracted and retracted. Guide 645 and sleeve 647 may be attached to retainer wall 632 or may be otherwise integral to retainer 631.

With reference to FIG. 44, the connecting member 644 is connected by a pin, screw, stud, rivet or equivalent mounting feature 650 to the periphery of moveable load bearing member 634. The outer wall surface of the member 634 has a protrusion 652 that receives one end of the deformable member 640. The other end of the member 640 engages the upwardly extending portion of the side wall or arm 642 to provide a biasing force against the moveable load bearing member 634. Load bearing member 634 is biased in the direction of the arrow thus causing the connecting member 644 to be maintained in a coiled position, wrapped around the periphery of the member 634, during static conditions.

Device 630 generally performs the same as devices 590, 620 and 626. A dynamic inertial activation force imposed on anchor 646 or device 630 causes offset mass 639 to facilitate the rotation of retention member 636, disengaging retention member contact surface 637 from contact with blocking member engagement surface 635, said force sufficient to overcome frictional surface contact resistance and the resistance of spring 638. This sequence of events permits anchor 626 to extract if the load imposed on the anchor when the interlock is disengaged is sufficient to distort the deformable member, thereby uncoiling connecting member 644 as load bearing member 634 rotates. Notable differences between device 630 and devices 590, 620 and 626 are that independent connecting members 644 are shown attached to an anchor 646 rather than an elongated load bearing deformable member. The moveable load bearing member 634 rotates as the anchor 646 extracts in opposition to the force of load bearing deformable member 640. Deformable member 640 is engaged with both the rotating moveable load bearing member 634 and the fixed position, side walls or upwardly extending arms 642 extending from base wall 632 of retainer 631. Load bearing deformable member 640 may act as a resilient load bearing deformable member assisting in the return of anchor 646 towards its initial pre-deployed position.

Alternatively, load bearing deformable member 640 may be configured to deform permanently such that the retraction of the anchor is not facilitated by deformable member 640, if an alternative rate of natural retraction or supplemented anchorage retraction are desired. A separate return assist member (not shown) may be incorporated to aid in the retraction of anchor 646 and re-spooling of connecting member 644 about the moveable load bearing member 634. Deformable member 640 may also be adapted to apply to preload anchor 646, opposite the direction of anchorage extraction. Connecting member 644 may be represented by a cable or alternative material suitable to carry the loads applied and permit deflection necessary to be displaced relative to member 634. The plurality of blocking engagement surfaces 635 shown may facilitate variable position, retraction interlocking relative to retention member 636, when member 634 recoils during rebound to prevent subsequent anchor extraction until predetermined conditions are met. Many of the functional device component relationships, functional capabilities and various adaptations relative to interlocks, indicators, sensors, controllers and other aspects described in reference to devices 590, 620 and 626 may be implemented in association with device 630, as applicable. The dynamic interlocking retention and blocking member engagement components may be omitted from device 630 in certain applications.

FIG. 45 illustrates an alternative device 660 that includes a retainer 673 having at least one base wall 662, and a generally non-deformable, moveable load bearing member 664. Member 664 is securable to upwardly extending side walls or arms 676 that extend from wall 662 of retainer 673. At least one rotating load bearing deformable member 666 is connected to moveable load bearing member 664. At least one arm 676 has an opening 678 for receiving at one end of member 666. Also provided are a torsion spring 668 and at least one connecting member 670 to which an anchor 672 may be attached or integral with. Deformable member 666 is represented in FIG. 45 by a torsion bar-like member. An end 680 of deformable member 666 is fixed to one extension arm. FIG. 45 illustrates end 680 fixed to arm 676 by passing through a keyed opening matching the geometry of end 680. The end 680 may also be affixed to side wall or arm 676 in an alternative manner, such as by way of fastener, welding, or other mechanical engagement. The opposing end of member 666 is contained and allowed to freely rotate relative to a geometrically compatible opening 679 disposed on end 682 of the opposing arm extending from wall 662. Thus, the fixedly attached relationship between end 680, arm 676 and load bearing member 664 prevents uninhibited, free rotation of member 664. Deformable member 666 is attached at some point along its length to moveable load bearing member 664. The point of attachment is not shown, but may vary along the length of member 666 in order to adjust performance characteristics. The base wall 662 has a guide channel portion 674 that encapsulates at least some portion of connecting members 670 and may further contain at least some portion of anchor 672. A guide sleeve 647 is further shown. The sleeve may be attached and perform the same functions in a manner similar to that described in reference to the FIG. 43 device.

End 686 of connecting member 670 is secured to the outer periphery of moveable load bearing member 664 by way of a stop 684. Stop 684 may be integral to the moveable member 664 or affixed to it. Stop 684 may be represented by a fastener, rivet, weld joint or comparable interfacing retention member, or may be represented by a feature such as a protrusion or block to which the connecting member may be secured as shown in FIG. 45. Connecting member 670 is shown engaged with stop 684, extending in a counter-clockwise direction around the periphery of the load bearing member 664, where it is then received within the guide channel 674. Connecting member 670 further interfaces with anchor 672. One end of spring 668 engages end portion 682 of arm 676 while the other end engages the outer side wall of the moveable load bearing member 664. While not shown, an inertial release or interlock mechanism of the type described in reference to FIGS. 39-43 may be incorporated.

When anchor 672 experiences loading of sufficient magnitude to initiate distortion of load bearing deformable member 666, the anchor may begin to extract as the deformable member manages the energy transferred by the anchor, through engagement between the hub 664 and connecting member 672. The spring 668 may provide an additional biasing force to further control the extraction of the anchor 672 when device 660 is activated. The motion of the anchor 672 is controlled by the rotational distortion of member 666. The initial position of the anchor relative to load bearing moveable member 664 is maintained in an interlocked position relative to the engagement between member 666 and retainer base extension arm 676. The position of final position of the member 664 may be interlocked due to permanent deformation of member 666. Stop 684 may be configured to engage a surface or feature of the retainer 662 in order to terminate the rotation of members 666 and 664, as described in reference to an alternative execution of the FIG. 39 device. Such an anchor extraction control may be achieved as a result of a stationary member of retainer 673 simply blocking the movement of the moveable load bearing member 664 or by member 664 penetrating and more permanently engaging feature on retainer base wall 662. Any such anchor displacement limitations imposed on the anchor may be described as interlocking and controlling. Spring 668 may also be adapted to apply a preload to member 664 or to facilitate the retraction of anchor 672 towards its initial position during rebound. End 680 of member deformable member 666 and aperture 678 in extension arm 676 may be adapted to maintain fixed engagement between components during anchor extraction and to further permit member 666 to be retained but free to rotate in a reverse direction relative to aperture 678 during retraction. This relationship permits permanent deformation of deformable member while allowing retraction of load bearing member 664 and the corresponding anchor. It will be appreciated that the spring 668 can be utilized with this device 660, or excluded such that the load bearing deformable member is solely operable resist extraction of the anchor 672.

Connecting member 670 may be represented by a cable or alternative material suitable to carry the loads applied and permit deflection necessary to be displaced relative to hub 664. The geometry of connecting member 670 may be altered in practical application. For example, the connecting member may be represented by a discontinuous loop or a single linear length as shown in device 630 of FIG. 43, have an alternative cross section, or be otherwise adapted to achieve its intended function. It will be appreciated that various geometric configurations of the load bearing deformable member 666 are also contemplated, wherein the load required to initiate extraction of the anchor, the rate of extraction, the energy managed and the total corresponding displacement of the anchor can be controlled by changing of the load bearing deformable members shape, mounting orientation, or point of attachment with moveable load bearing member 664. A plurality of deformable members may also be incorporated in parallel or in series to further customize the functional capabilities of device 660, to achieve such benefits as previously described in reference to device 626. Load bearing deformable members may be disposed on a central axis of load bearing member 664 or off axis to further achieve alternative performance. Various other adaptations relative to interlocks, indicators, sensors, controllers and other aspects described in reference to other embodiments described herein may also be applicable to further enhance the range of function of device 660.

FIG. 46 illustrates a perspective view of an alternative energy management device 690 that employs a retainer 691 having a base wall 692, and a generally non-deformable moveable load bearing member 694. Device 690 also includes at least one connecting member 696 and an anchor 698. Member 694 includes at least one outer surface or side wall that is operable to function as a load bearing deformable member 700, having a tapered slot 702 that extends adjacent to the periphery of the member 700. Base wall 692 has a pair of upwardly extending side walls or arms 704, at least one of which has a tab 706 extending perpendicular from the member 704, towards load bearing moveable member 694. Tab 706 is operable to engage slot 702. In its initial position, tab 706 fits within the end of slot 706 having the largest opening size. Tab 706 may fit snugly or may exhibit a slight clearance condition with respect to slot 702 in this position. Tab 706 is larger than the opening at the opposite end of slot 702. Load bearing moveable member 694 rotates about an axle 708 that extends through side walls or arms 704 and member 694. Member 694 is securable to upwardly extending arms 704 through axle 708. A guide sleeve 647 is further shown. The sleeve may be attached and perform the same functions in a manner similar to that described in reference to the FIG. 43 device.

A stop 710 is affixed to an outer periphery of the member 694 and is operable to receive one end 712 of the connecting member 696. The opposing end 714 of the connecting member 696 is secured to the anchor 698. One or more springs 716 may be disposed between one or more arms 718 and walls 720 of the moveable member 694 (shown), and/or deformable member 700 (not shown). Stop 710 may be integral to moveable member 694 or affixed to it. Stop 710 may be represented by a fastener, rivet, weld joint or comparable interfacing retention member, or may be represented by a feature such as a protrusion or block to which the connecting member may be secured as shown in FIG. 46. While not shown, an inertial release or interlock mechanism as described in reference to FIGS. 39-43 may be incorporated. Stop 710 may further serve as a blocking member engagement surface in such instances. Stop 710 may also be operable to engage a stationary feature disposed on the retainer base wall for the purposes of interlocking or limiting anchor extraction as described relative to the FIG. 45 embodiment.

Anchor 698, interfacing moveable load bearing member 694 through one or more connecting members 696, may be extracted when a force of sufficient magnitude is applied, causing the counterclockwise rotation of moveable member 694 to overcome an initially interlocked interference condition between tab 706 as it advances within tapered slot 702. Tab 706 may deform the inside surface of the slot 702, disposed on load bearing deformable member 700, as the moveable member 694 rotates in the direction of the arrow. Alternatively, the inner surface of slot 702 may instead deform tab 706 as moveable member 694 rotates, or slot 702 and tab 706 may both deform as member 694 rotates. A slot having a stepped, or otherwise variable surface profile geometry, may be employed. Similarly, an additional slot and tab may be added to the same surface of deformable member 700 shown engaged with load bearing member 694, or may be added to the surface of member 720 symmetrically opposite member 700, at the other end of moveable member 694, wherein member 720 would also be represented as a deformable member. It will be appreciated that the position, geometry and material composition of one or deformable members 700, slots 702, or tabs 706, relative to the axis of axle 708, may be altered to affect the rate or total amount of anchor displacement permitted and/or energy management capabilities of device 690. As such, the function of the device is controlled by an interlocking relationship between a tab-like feature 706 disposed on a stationary member of device 690, and a slot-like aperture 706 disposed on a moveable member of device 690. Various working component relationships, functional capabilities and adaptations relative to dynamic or retraction interlocks, indicators, sensors, controllers and other aspects described in reference to devices 590, 620, 626, 660 or other embodiments described herein may additionally be employed in association with device 690, as applicable.

FIG. 47 illustrates the FIG. 46 device 690, from the perspective of the arrows of section cut 47-47. Axle 708 is shown extending through an opening 722 in side walls or arms 704. Spring 716 encapsulates an end of axle 708, imparting a biasing force against load bearing moveable member 694.

FIG. 48 illustrates a sectional view of an alternative energy management device 730 that employs at least one stud, pin, threaded fastener or the like, engaging a at least one hole in an axle member interfacing a load bearing moveable member. As the load bearing moveable member rotates relative to the stud, pin or threaded fastener, a resistive force is applied in opposition to the force imparted by the extracting anchor. This force is imparted as the result of an intended interference condition between the stud and a hole in the rotating, moveable load bearing members axle. The device 730 includes a retainer 731, having a base wall portion 732 and a load bearing moveable member portion 734. Axle 736 interfaces moveable load bearing member 734 and is pivotally connected to side walls or upwardly extending arms 738 that extend from wall 732. At least one spring 740 and a protrusion, pin, fastener, stud-like member, or the like, 742 are shown. The axle 736 includes at least one hole 746 that is operable to receive a corresponding protruding stud-like member 742 that passes through an opening in wall or arm 738 or may extend integrally from wall 738 without incorporating a hole 746. Load bearing moveable member 734 may be fixed to an independent axle 736 by conventional means to allow rotation of hub 734 relative to the arms 738. Axle 736 may be represented by a deformable member affixed to member 734, said axle operable to distort relative to the surface of stud 742 when member 734 rotates. Axle 736 may represent an integral portion of member 734, in which case member 734 would function both as a moveable and a deformable load bearing member. A connecting member 744 engages anchor 698 (not shown) at one end, and is both affixed to, and wrapped around, the perimeter of moveable member 734 at its other end, in a manner similar to that shown in FIGS. 43, 45 and 46.

Anchor 698 (not shown), interfacing moveable member 734 through one or more interfacing connecting members 744 in any manner described relative to FIGS. 44-47, may be extracted when a force of sufficient magnitude is applied, causing the rotation of hub 734 to overcome the interlocking interference condition between the stud 742 and hole 746 in axle 736. The surface interference condition between stud 742 and the wall surface of hole 746 in axle 736 generate resistive frictional loading in opposition to the direction of anchorage extraction, thereby managing the energy imparted through the anchor and limiting the displacement of the anchor. The motion of the anchor may terminated upon reaching predetermined interlocking interference condition limitations between stud 742 and the wall surface of hole 746 in axle 736. The interfacing surface geometries of stud 742 and hole 746 may be adapted so the corresponding interference condition causes a constant resistive force in opposition to anchorage extraction, or may be further adapted to provide continuously increasing, fixed interval or step-wise and incrementally increasing, or otherwise variable, resistive loading that increases or decreases in magnitude as the moveable load bearing member 734 rotates and anchor 698 is extracted. One or more springs 740 may be disposed between one or more side walls or arms 738 and the hub 734, to provide a biasing force opposing the direction of the extraction. Such a force may be beneficial to further resist the extraction of the anchor and aid in energy management, to provide a preloaded condition prior to extraction, and/or to aid in the retraction of the anchorage. Rebound retraction interlocking features not shown here may also be included as referenced in the description of prior embodiments.

Hole 746 my have constant diameter along its length, or be may be tapered over at least some portion engaging stud 742. Similarly, stud 742 may also have a constant diameter or may be tapered over at least some portion engaging hole 746. Either or both the stud 742 or the hole 746 may incorporate a plurality of diameters that vary continuously, in a distinct stepwise fashion, or in any combination of the same, along their respective lengths. Either or both the axle hole or the stud may adopt a cross sectional geometry that is represented by an engagement surface that is other than round (triangular, square, octagonal, etc). Either or both the axle hole and the stud may be configured to deform relative to one another as the moveable member 734 rotates during anchorage extraction. Either or both the axle hole and the stud may be threaded or disposed to enable a thread cutting surface contact engagement, wherein a threaded portion of either the hole or stud deforms the unthreaded engagement surface of the opposing member, as moveable load bearing member 734 rotates relative to side walls or extension arms 738 during anchorage extraction. In the event that both the axle hole and stud are initially threaded by design, the thread pitch may differ between the hole and stud to cause additional rotational resistance.

Interfacing material property selection and the geometric combination of similar or dissimilar, tapered or constant diameter, threaded or unthreaded engagement surfaces of the axle hole and stud may be adapted in a plurality of configurations to achieve a variety of energy management and anchorage displacement characteristics for the benefit of occupant safety, as previously described herein. Additional stud and axle hole interference relationships may be further introduced at the other end of axle 736 to further tune the energy management and anchorage displacement characteristics. Such relationships may be adapted to exist in close proximity to the axle and moveable member interface or at the farthest end of axle 736. Spring 740 may be omitted in some applications and the corresponding side wall or extension arm 738 engaging spring 740 may be relocated adjacent to the hub in the absence of spring 740. The axle 736 of member 734 may be axially disposed aligned with the central axis of the member 734, or may be disposed off axis or askew to the perpendicular central axis in order to further affect unique energy management and displacement characteristics of an extracting anchor. The function of the device is controlled by an initially interlocked condition between one or more generally secured, fixed position stud like attachment components, operable to engage corresponding openings in the ends of a moveable deformable axle member. The rate, the amount of anchor displacement, and energy management characteristics of the device are further defined by the limitations of the corresponding deformation of either or both of the axially engaged members, wherein said members may bind and interlock at the extraction limit. It may be further desirable to configure the device to enable a return assist member to aid in unbinding the interlocked condition for the purposes of anchor retraction. The stud may further be permitted to rotate during extraction or when extracting for the benefit of device performance.

Further adaptations relative to dynamic or retraction interlocks, indicators, sensors, controllers and other aspects described in reference to alternative embodiments otherwise sharing similar content and device function may be adapted in the same manner as described, where applicable to device 730. For example, relative to the devices depicted or described in reference to FIGS. 39-48, a device may include an inertial release interlock further configured to also provide retraction interlocking capabilities. Either the base walls, side walls or arms extending from the retainer base wall may incorporate slide masses, pins, spring biased lever arms or the like, operable to engage one or more protrusions, detents, or apertures in the appropriate adjacent side wall, end wall or circumferential perimeter wall of hub-like load bearing retainer member, for the purpose of controlling the position of an anchor.

Alternatively, said features may instead be disposed on the load bearing retainer member to engage corresponding mating features associated with said base wall members. Said slide masses, pins and fixed or rotatable lever arms or catches may represent a retention member of an inertial interlock controlling initial dynamic displacement of an associated anchor, may represent an interlocking member operable to engage during the retraction phase of device operation in order to control subsequent displacement of said anchor, or may represent an interlocking stop to limit extraction of an anchor. The position of said slide masses, pins and levers may be controlled electronically by some combination of sensor, controller or actuator, or may be operable to function mechanically, reliant upon inertial forces imparted on the device sufficient to overcome spring bias and various frictional engagement forces previously described to facilitate dynamic release of a retained anchor. Said members may also be operable to engage a mating interlocking engagement surface when alignment between two interlocking surfaces or members permits a simple spring biasing to enable positive engagement between a protruding member and an interlocking engagement surface. Various interfacing component geometries disposed on either of said base wall or load bearing members may further serve to engage one another under dynamic displacement conditions for the purposes of interlocking to limit total anchor displacement, Guides, grooves, channels may be incorporated on various members or said retainer to facilitate relative movement of a protrusion operable to deform a distortable membrane, or to direct the motion path of an inertial blocking mass, etc. Distortable membranes may be incorporated between a base wall and circumferential wall of two adjacent retainer members, or between a side wall extending from a base and an adjacent side or end wall of a hub-like load bearing retainer member. While not shown in association with latter figures, many of such adaptations provide the same functionality as the interlocks described in reference to the devices of FIGS. 2 through 18. 28 and 29, for example.

Figure 49:
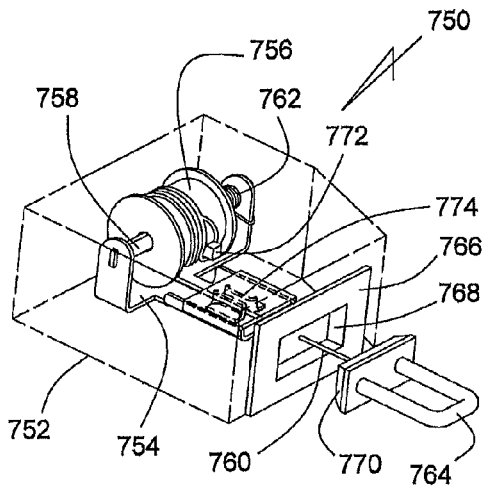
FIG. 49 illustrates a perspective view of an alternative energy management system that includes a guide receptacle feature for maintaining and restoring the position of an extractable anchor.

FIG. 49 illustrates an alternative energy management device 750 that includes a receptacle feature for maintaining and restoring the position of an extractable anchorage. An adaptation of device 660 is shown for illustration purposes only. Device 750 includes a retainer or housing 752, at least one wall 754, a load bearing moveable member 756 and axle 758, at least one connecting member 760, an anchor 764 and a guide receptacle 766 for receiving an anchor 764. Device 750 may further include one or more springs 762. The guide receptacle 766 has a receiving portion 768 that is geometrically compatible with, and mates to, an insert portion 770 on the anchor 764. The guide receptacle 766 is operable to maintain the pre-deployment position of anchor 764 and to receive and restore anchor 764 to the same position upon being retracted. The receptacle may also operate to supplement in guiding the path of the connecting member 760 with respect to member 756 as anchor 764 is extracted. An internal guide 774 is also provided and may be operable to provide a guide path for one or more connecting members to travel within when the anchor is extracted and retracted. Internal guide 774 and receptacle guide 766 may be attached to a retainer wall or may be otherwise integral to the device housing or retainer.

Spring 762 may impart a biasing force to aid in maintaining the initially fixed position of insert portion 770 relative to the receiving portion 768 of the member 752. Alternative configurations depicted, or described in reference to the devices shown in FIGS. 43 through 48 may also be incorporated within retainer or housing 752. Such configurations may incorporate alternative representations of member 762, or may not require use of member 762 at all. In such instances, the anchor 764 and insert portion 770 may remain rigidly engaged with receptacle 768 as a result of the alternative component relationships that permit the omission of spring 762. Connecting member 760 is shown affixed to the insert portion end of anchor 764 at one end and secured to the outer periphery of the load bearing member 756 at its other end by rivet, stud, weld or comparable method for similar means of a fastener 772. It will be appreciated that the axle 758 can be represented by any of a variety of non-limiting members, such as those described in reference to embodiments depicted in FIGS. 42-48. The device 750 may be located in various positions, for example those shown in FIG. 50. Receptacle 766 and insert portion 768 are shown here having tapered engagement surfaces. It is appreciated that the rectangular shape of the receptacle and insert potions may differ while still providing a compatible interfacing guide relationship to aid in situating the anchor relative to its pre-deployed upon being retracted.

FIG. 50 illustrates a variety of possible mounting configurations for various energy management devices to create a system 800 including a child seat 12 disposed in a vehicle environment wherein one at least of the restraint devices illustrated or described herein may be employed. Device 10 is shown for example purposes. The devices 10 can be secured in immediate proximity to legally defined anchorage mounting locations, or may be mounted in any of a variety of satellite locations wherein only the anchor attachment surfaces themselves are located in conventional locations and the balance of the device hardware may be mounted to a structural or load bearing member of the vehicle such as the vehicle seat back 802, or may be located beneath the seat 804, behind the seat 806, on the floor 808 of the vehicle, in the trunk (not shown) or be affixed to package tray or roof 810. The restraint devices 10 can be located in a variety of locations permitted by law, within the cabin of a vehicle, to enable compliant child seat attachment with the anchors. Guide features such as pulley wheels, low friction sleeves or travel channels and the like (not shown) may be incorporated in conjunction with, or in proximity to, the vehicle components to which an energy management device or system may be attached to ensure the connecting members are able to travel without obstruction between the retainer or housing and interfacing end user anchorage access points, enabling the anchors to be freely extracted and retracted in practical use.

Figure 51:
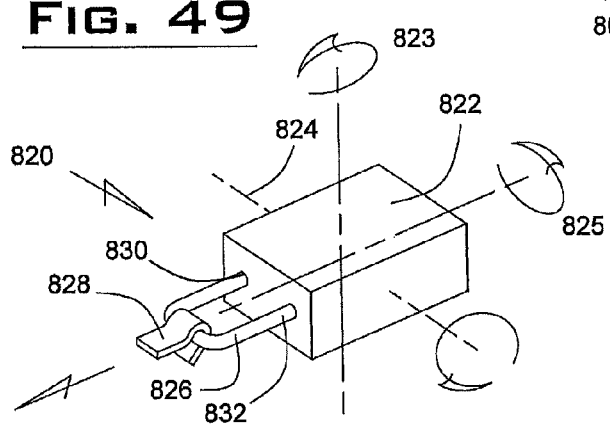
FIG. 51 illustrates a pivotally mounted energy management device.

FIG. 51 illustrates an alternative energy management device 820 wherein the retainer 822 is mounted relative to one or more pivot axes 823, 824 or 825. The anchor 826 is connected to a child seat engagement feature such as a hook, clip, clasp, or claw-like mechanism 828, or the likes using conventional methods described above. Mounting the retainer 822 relative to at least one pivot axis 823, 824 or 825 may enhance the extraction/retraction performance of an energy management anchorage device such as device 820. Such mounting configurations adapted to device 820 may to allow the assembly to pivotally rotate about one or more axes as the device is functioned. The device may correspondingly reorient and naturally realign itself such that anchor 826 is extracted in the direction of the load applied to anchor through engagement with interfacing child seat attachment feature 828. Said otherwise, pivotal mounting may ideally permit an anchor, its associated interfacing connecting members and moveable member (not shown) to be displaced axially in the direction of the arrow shown. The extraction and retraction of anchor 826 and associated connecting members 832 is then permitted to occur, perpendicular to one or more openings 830 in the retainer 822 shown. Pivotal mounting may increase functional robustness in certain situations by minimizing the application of off-axis loading askew to the intended path of anchor travel and load bearing deformable member distortion. A pivotal mounting scheme may further serve to minimize any binding and undesired transverse loading that might occur as device 820 operates, facilitating in the provision of an optimized and uninhibited extraction and retraction path for the anchor and connecting members, while minimizing unintended deformation of anchors and connecting members in practical use. The device 820 may instead be represented by any of the previously depicted embodiments, the forthcoming embodiments, or adaptations to the same in order to enhance or optimize the functional performance capabilities of the device or system for a particular application.

Figure 52:
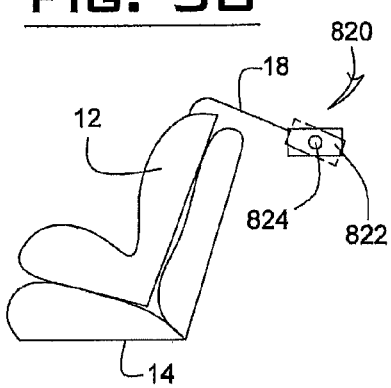
FIG. 52 illustrates one example of a pivotally mounted energy management device mounted relative to a vehicle seat.

FIG. 52 illustrates device 820 mounted about a cross-vehicle pivot axis 824, relative to a vehicle seat 14 and a child seat 12. For this embodiment, a child seat top tether 18 is shown, connecting child seat 12 with device 820. In this example, device 820 may rotate about axis 824 to realign itself as the tension in tether 18 is increased during child seat installation. The device may rotate still further under dynamic loading conditions to benefit from the functional advantages described in reference to FIG. 51 above. It is further noted that similar pivotal mounting configurations may be adopted, wherein the initial mounting orientation of device 820 has been amended, or to incorporate device 820 in alternative locations within the vehicle environment in association with top tether or lower anchorages, or any other relevant configuration of embodiments otherwise described herein.

Figure 53:
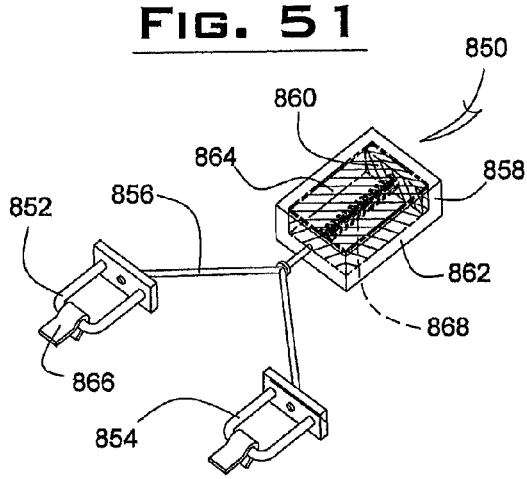
FIG. 53 illustrates an alternative energy management system wherein a pair of moveable anchors are configured to react against one or more deformable members disposed in a common location.
Figure 54:
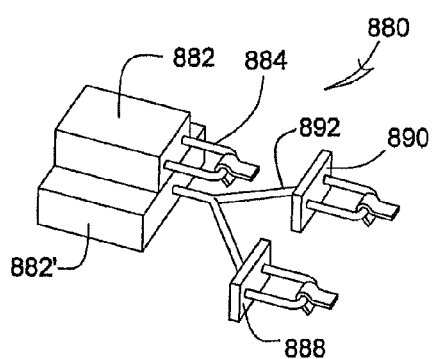
FIG. 54 illustrates an alternative energy management anchorage system in which one or more deformable members may be disposed within a single housing or interfacing housings.

FIG. 53 illustrates an energy management anchorage system 850 that employs features and functionality of the nature described in reference to the aforementioned Figures and restraint device embodiments, wherein a device 858 is adapted to control energy management and corresponding anchor displacement characteristics of at least 2 anchors 852 and 854 that may be connected via a yoke-like interface. The particular geometry and configuration of components of device 858 are provided for illustrative reference purposes only. Energy management anchorage system 850 includes a device 858 having a retainer 862 having at least one wall, at least one load bearing deformable member 864 and a moveable member 860 disposed relative to said retainer. System 858 may further incorporate one or more return assist members 868. The various functional advantages and alternatives to the above mentioned components have been discussed in reference to earlier figures. The yoke-like interface is comprised of one or more connecting members 856. The connecting member 856 may consist of one or more cables, connecting rods or similar attaching members interconnected by way of fastener, clamp, crimp, weld, etc, facilitating displacement of at least one moveable member 860 and the corresponding extraction and retraction of anchors 852 and 854.

Alternatively, yoke-like connecting member 856 may be represented by a single component. Furthermore, anchors 852 and 854, connecting members 856 and at least one moveable member contained within retainer 858 may be represented by a plurality of interconnected components or may be represented by a single integrated component. Guide features of the nature described in reference to FIG. 50 may be incorporated as necessary to facilitate unobstructed extraction and retraction of the connecting members 856 when generally disposed at a distance from the remainder of components comprising device 858.

The pair of anchors 852 and 854 work in concert to cause moveable member 860, interfacing with connecting member(s) 856, to react against the load bearing deformable member 864, as the anchors are extracted, if sufficient input loading is imparted on the anchors to meet predetermined threshold criteria and initiate the deformation of load bearing deformable member 864. The locations of anchors 852 and 854 within the vehicle shall be compliant with the applicable legal requirements so as to be engaged by child seat tether clips or alternative releasable engagement clips, clasps or claw-like mechanisms 866 associated with a child seat assembly (not shown). The retainer 862 is illustrated with transparent exterior surfaces to simplify the depiction of the various internal components discussed. The lengths of the connecting members may be adjusted permit adequate extension between anchors and retainers mounted in satellite locations. As has been previously stated in reference to the various aforementioned embodiments, the geometries, orientations and quantities of the components comprising energy management anchorage system 858 may be varied to achieve the functional and packaging needs for a given application, while offering the same performance capabilities already having been described.

FIG. 54 illustrates a combined energy management system 880 wherein housing or retainer portion 882, and portion 882', employ an upper tether restraint anchor 884, lower anchors 888 and 890 and corresponding energy management capabilities, respectively. The housing portions 882 and 882' may employ any of the energy management devices discussed hereinabove, and device 880 may benefit from the same forms of component consolidation and combined usage and functionality as described herein. The pair of anchors 888 and 890 interface with one or more connecting members 892 and work in concert with the components of retainer portion 882', and may function independently from anchor 884 and the energy management components contained within retainer portion 882. Retainer portions 882 and 882' may represent portions of a combined housing containing the majority of components of device or system 880, wherein the components may be further separated by internal compartments, if necessary. Alternatively, retainer portions 882 and 882' may represent independent retainers with self contained energy management capabilities that are stacked and interface directly with one another when packaged in a vehicle environment. The energy management functionality may be consolidated within a single housing or differentiated between an upper and a pair of lower anchorages, for example. The lengths of the connecting members may be adjusted permit adequate extension between anchors and housings mounted in satellite locations.

FIG. 55 illustrates an energy management device or system 900 that employs a common housing or retainer 902, a pair of lower anchors 916, and an upper anchor 918. The anchors 916 and 918 may operate either independently or in concert, being extracted in the same direction with respect to retainer 902 when the device is dynamically activated. Retainer 902, in the present embodiment, may represent the incorporation of individual energy management devices 904, 906 and 908, combined within a single enclosure, sharing one or more interior wall surfaces and each of which employ at least one load bearing deformable member 920, at least one connecting member 922, at least on moveable member 914 and may incorporate one or more return assist members 912, anchor position controlling interlocks (not shown) and various other components previously discussed herein.

Alternatively, the device or system 900 may be configured to incorporate combined energy management and anchorage displacement functionality for the upper and lower anchors inclusive within a single enclosure, or may provide combined functionality for the pair of lower anchors while the upper anchor functions independently, relative to one retainer. In such configurations associated with a single retainer, the lower anchors may share in combined use of a single moveable member, one or more return assist members, one or more load bearing extendable, compressible or rotatable deformable members or various interlocking features, for the purposes of design package space and component cost efficiency. Alternatively, in certain instances, the upper and lower anchors may concurrently share in combined use of the same components relative to a single retainer. The lengths of the connecting members may be adjusted permit adequate extension between anchors and retainers mounted in satellite locations. Geometries of components, quantities and configurations, may vary to achieve the abovementioned goals.

FIG. 56 illustrates an energy management device 940 that employs a retainer 942 that may be represented by an enclosure or housing having one or more internal compartments and two or more load bearing deformable members. Said load bearing members may share a single compartment or be disposed relative to a retainer that is not enclosed. For illustration purposes, two compartments are shown relative to an enclosed retainer or housing, wherein the compartments employ at least a first load bearing deformable member 944 and a second load bearing deformable member 946. An intermediate interior member 948 may be disposed to separate the first and second compartments and to facilitate independent operation. One or more return assist members 950 may be disposed relative to the retainer to bias a movable member 952 or member 948, if included. Member 948 may be disposed to remain fixed during dynamic operation of device 940 or be permitted to travel and compress one or more load bearing deformable members 946 in conjunction with member 952, or sequentially. The load bearing deformable members may share the same material performance properties, having dissimilar geometries, or may incorporate dissimilar deformation characteristics in order to facilitate tuning the device to achieve a plurality of load carrying, energy management and anchor displacement capabilities. This device and the devices depicted in FIGS. 53-55 and FIG. 57 may be adapted to incorporate load bearing deformable members that are extended rather than compressed as an anchor is extracted. Intermediate member 948 may be omitted from device 940 and moveable member 952 may cause a series of 2 or more independent load bearing deformable members (such as members 944 and 946) within a single cavity of housing 942 to be distorted simultaneously or sequentially for the purposes of providing tailored energy management and anchorage displacement performance characteristics. Alternative embodiments previously shown may be adapted to perform as described in reference to FIG. 56. Interlocking features may also be incorporated in association with device 940, as previously discussed. The device 940 can be further designed to have different extraction rates relating to individual anchors.

FIG. 57 illustrates an alternative energy management device or system 970 that employs functional capability of permitting both top tether and lower anchorage extraction as a result of consolidating previously described energy management feature content relative to a common retainer, or within in a common housing, wherein the direction of extraction of the top tether anchor opposes that of the lower anchorages. The device 970 includes a retainer 972, a first connecting member 974 and interfacing anchor 976, and at least a second connecting member 978 interfacing with anchors 980 and 982, interfacing with child tether hook, clip, clasp or claw-like mechanisms 984 to secure the child seat to the vehicle seat. At least one load bearing deformable member 986 is disposed relative to retainer 972 and one or more return assist members 988 may be disposed as necessary to react against either or both of the moveable members 990 and 992. The retainer, if represented by a housing or enclosure, may include only a single internal compartment, or may include two or more compartments. The housing shown in FIG. 57 has a first compartment 994 and a second compartment 996, each of which contain a moveable member 990 or 992, one or more connecting members 974 or 978, at least one load bearing deformable member 986 and may include return assist members 988. The compartments 994 and 996 may, but need not necessarily, be separated by an intermediate member 998 that may operate as a barrier between the compartments. The lengths of the connecting members may be adjusted permit adequate extension between anchors and housings mounted in satellite locations. Device or system 970 may employ any of the feature content, component hardware or functional capabilities otherwise discussed or depicted hereinabove. Device 970 may benefit from the same forms of component consolidation and combined usage and functionality as described in reference to prior figures. The relative proportional sizes of deformable members 986, or compartments 994 and 996 as applicable, may vary to allocate disproportionate space relative to the opposing ends of retainer 972 for upper and lower anchorage extraction, retraction or interlocking feature content. While not shown, moveable members and corresponding deformable members may be oriented concentrically and in the same plane rather than stacked in series. Connecting members, anchors and moveable members may be represented by integral or separately attached portions.

FIG. 58 illustrates an energy management anchorage system of the sort described in reference to such Figures as 53, 54, 55 and 56, mounted in a satellite location, fixed to the bottom 1000 of a seat 14. For discussion purposes, the FIG. 54 device 880 is discussed in this embodiment with the upper anchor 884 shown extending behind the back of the vehicle seat, while lower anchors 888 (shown) and 890 (not shown) are disposed in the bite line between the vehicle seat cushion and seat back.

FIG. 59 illustrates a vehicle seat 14 with an energy management anchorage system such as that embodied in system 970 of FIG. 57. Here, the housing 972 is secured to the seat back 1002 at a satellite location disposed between the upper and lower anchorage locations. Anchor 982 (shown) and 980 (not shown) are located at intersection of the seat cushion and seat back for end user access. The top tether anchor 976 is oriented near the top of the seatback 1002 of the seat 14.

It will be appreciated that energy management anchorage devices described in reference to FIGS. 58 and 59 can be secured in a host of locations, as shown in FIG. 50, providing compliance is achieved with regard to a variety of vehicle safety requirements. It will further be appreciated that an assortment of alternative arrangements are contemplated for these devices, beyond those disclosed herein.

In reference to FIGS. 50-59, the energy management anchorage systems of this nature may be disposed in satellite locations displaced from immediate proximity to the legally defined anchorage engagement points within a vehicle. Therefore, as previously described, in cases where extended connecting members such as cables are used to join the moveable member disposed within a housing, or relative to a retainer, that is affixed to a satellite location at a distance from an anchor oriented in a commonly accepted location for child seat engagement in a vehicle environment, the connecting member will benefit from the incorporation of a guide feature such as a guide channel, pulley wheel, sleeve-like enclosure, or the like which serves to reduce friction and facilitate the uninhibited displacement of the connecting member in order to optimize the extraction/retraction capabilities of the child anchor during the energy management and rebounding phases. These features (while not shown) would generally be expected to be affixed to a structural member of the vehicle or in proximity to the energy management device and/or anchorage locations themselves.

The invention claimed is:

1. A dynamic displacement energy management device comprising:
   a base member having a load bearing hub member and a blocking surface;
   an interlock pivotably connected to said base member; and
   a load bearing deformable member disposed around a radial face of said hub member, secured at an end by said interlock biased against said blocking surface, and operatively attached to an anchor to bear an applied load,
   wherein when a dynamic load condition applied to said anchor overcomes said biasing of said interlock, said load bearing deformable member disengages from said blocking surface.

2. The device as claimed in claim 1, wherein the load bearing deformable member is securable to said hub member, said deformable member is loop shaped and has a first end for wrapping around said hub member and a second end associated with an anchor.

3. The device as claimed in claim 1, wherein distortion of said deformable member is operable to control energy management.

4. The device as claimed in claim 1, wherein said deformable member is rigid in a first condition and distortable under predetermined loading conditions for the purposes of managing energy in a second condition.

5. The device as claimed in claim 1, wherein said interlock includes a spring biased retention member extending from one of said walls.

6. The device as claimed in claim 1, wherein said deformable member is pliable and made of multi-strand material.

7. The device as claimed in claim 5, wherein said load bearing deformable member includes an elongated loop, and further comprising a stop positioned on said base member operable to discontinue displacement of said load bearing deformable member by restraining said elongated loop, thereby controlling a position beyond which said anchor may not be extracted during dynamic conditions.

8. The device as claimed in claim 5, wherein said interlock controls a position beyond which said anchor may not be extracted in one condition and permits displacement of said anchor in another condition.

9. The device as claimed in claim 1, wherein said guide is located on said load bearing member for receiving said deformable member and guiding the position of said deformable member and said anchor.

\* \* \* \* \*